United States Patent
Senesac

(10) Patent No.: US 9,880,694 B2
(45) Date of Patent: Jan. 30, 2018

(54) SHOP ORDER STATUS VISUALIZATION SYSTEM

(71) Applicant: The Boeing Company, Chicago, IL (US)

(72) Inventor: Christopher J. Senesac, Daniel Island, SC (US)

(73) Assignee: THE BOEING COMPANY, Chicago, IL (US)

(*) Notice: Subject to any disclaimer, the term of this patent is extended or adjusted under 35 U.S.C. 154(b) by 691 days.

(21) Appl. No.: 13/890,347

(22) Filed: May 9, 2013

(65) Prior Publication Data
US 2014/0337777 A1  Nov. 13, 2014

(51) Int. Cl.
| | |
|---|---|
| G06F 3/048 | (2013.01) |
| G06F 3/0481 | (2013.01) |
| G06Q 10/06 | (2012.01) |
| G06Q 30/06 | (2012.01) |
| G05B 19/418 | (2006.01) |
| B64F 5/10 | (2017.01) |

(52) U.S. Cl.
CPC ............ *G06F 3/0481* (2013.01); *B64F 5/10* (2017.01); *G05B 19/41805* (2013.01); *G06Q 10/0633* (2013.01); *G06Q 30/0621* (2013.01); *G05B 2219/31027* (2013.01); *G05B 2219/31029* (2013.01); *G05B 2219/31046* (2013.01); *Y02P 90/04* (2015.11)

(58) Field of Classification Search
CPC ..................................... G06F 3/048
USPC ....................................... 715/771
See application file for complete search history.

(56) References Cited

U.S. PATENT DOCUMENTS

| | | | |
|---|---|---|---|
| 3,744,917 | A | 7/1973 | Craig |
| 4,815,190 | A | 3/1989 | Haba et al. |
| 4,894,908 | A | 1/1990 | Haba et al. |
| 5,023,805 | A | 6/1991 | Aune |
| 5,367,552 | A | 11/1994 | Peschmann |
| 5,544,558 | A | 8/1996 | Hughes |
| 5,771,043 | A | 6/1998 | Nigawara et al. |
| 5,822,218 | A | 10/1998 | Moosa et al. |
| 5,960,104 | A | 9/1999 | Conners |
| 6,000,610 | A | 12/1999 | Talbott et al. |
| 6,167,394 | A | 12/2000 | Leung et al. |
| 6,240,328 | B1 | 5/2001 | LaLonde et al. |
| 6,345,207 | B1 | 2/2002 | Nitta et al. |

(Continued)

FOREIGN PATENT DOCUMENTS

| | | |
|---|---|---|
| CN | 1609852 A | 4/2005 |
| CN | 1983268 A | 6/2006 |
| CN | 101329624 A | 12/2008 |
| DE | 102005005266 A1 | 8/2006 |

(Continued)

OTHER PUBLICATIONS

Extended European Search Report, dated Sep. 30, 2014, regarding Application No. EP14159760.9, 6 pages.

(Continued)

*Primary Examiner* — Xuyang Xia
(74) *Attorney, Agent, or Firm* — Yee & Associates, P.C.

(57) ABSTRACT

A method and apparatus for visualizing an assembly of parts for an aircraft. A shop order instance is identified for the assembly of parts for the aircraft. A volume is identified for the shop order instance. The assembly of parts is displayed within the volume in context with a number of assemblies of other parts within the volume.

19 Claims, 22 Drawing Sheets

(56) References Cited

U.S. PATENT DOCUMENTS

| | | |
|---|---|---|
| 6,378,387 B1 | 4/2002 | Froom |
| 6,381,509 B1 | 4/2002 | Thiel et al. |
| 6,418,189 B1 | 7/2002 | Schafer |
| 6,477,471 B1 | 11/2002 | Hedstrom et al. |
| 6,481,096 B2 | 11/2002 | Lehmker |
| 6,487,479 B1 | 11/2002 | Nelson |
| 6,597,761 B1 | 7/2003 | Garms, III |
| 6,604,681 B1 | 8/2003 | Burke |
| 6,637,266 B1 | 10/2003 | Froom |
| 6,912,507 B1 | 6/2005 | Phillips |
| 6,941,204 B2 | 9/2005 | Halm |
| 7,042,346 B2 | 5/2006 | Paulsen |
| 7,050,894 B2 | 5/2006 | Halm et al. |
| 7,103,434 B2 | 9/2006 | Chernyak |
| 7,167,583 B1 | 1/2007 | Lipson et al. |
| 7,302,443 B2 | 11/2007 | Nakajima et al. |
| 7,333,991 B2 | 2/2008 | Hill et al. |
| 7,343,213 B1 | 3/2008 | Burgess |
| 7,353,192 B1 | 4/2008 | Ellis et al. |
| 7,365,747 B2 | 4/2008 | Finlayson et al. |
| 7,366,688 B2 | 4/2008 | Kwasniewski et al. |
| 7,646,384 B2 | 1/2010 | Anderson et al. |
| 7,650,202 B2 | 1/2010 | Strohband et al. |
| 7,933,441 B2 | 4/2011 | Numata |
| 7,954,070 B2 | 5/2011 | Plocher |
| 8,027,745 B1 | 9/2011 | Freeze |
| 8,051,547 B2 | 11/2011 | Toh |
| 8,079,130 B2 | 12/2011 | Hardouin-Finez |
| 8,116,529 B2 | 2/2012 | Edwards |
| 8,352,904 B2 | 1/2013 | Hodges |
| 8,482,412 B2 | 7/2013 | Majoros et al. |
| 8,527,348 B2 | 9/2013 | Petrov |
| 8,571,951 B2 | 10/2013 | Diana et al. |
| 8,606,540 B2 | 12/2013 | Haisty et al. |
| 8,610,761 B2 | 12/2013 | Haisty et al. |
| 8,620,627 B2 | 12/2013 | Nakhle et al. |
| 8,791,823 B2 | 7/2014 | Xu |
| 8,849,636 B2 | 9/2014 | Becker |
| 8,860,760 B2 | 10/2014 | Chen |
| 8,914,149 B2 | 12/2014 | Safa-Bakhsh et al. |
| 9,488,592 B1 | 11/2016 | Maresca et al. |
| 2002/0007225 A1 | 1/2002 | Costello et al. |
| 2002/0026296 A1 | 2/2002 | Lohmann |
| 2002/0071524 A1 | 6/2002 | Renkart |
| 2002/0168083 A1 | 11/2002 | Garms |
| 2002/0198764 A1 | 12/2002 | Schorno |
| 2003/0055619 A1 | 3/2003 | Singarajan |
| 2003/0055812 A1 | 3/2003 | Williams et al. |
| 2003/0083794 A1 | 5/2003 | Halm |
| 2003/0120472 A1 | 6/2003 | Lind |
| 2003/0149500 A1 | 8/2003 | Faruque |
| 2003/0158702 A1 | 8/2003 | Busche et al. |
| 2004/0093100 A1 | 5/2004 | Gleis |
| 2004/0098151 A1 | 5/2004 | Carlucci et al. |
| 2004/0128117 A1 | 7/2004 | Crandall |
| 2004/0162651 A1 | 8/2004 | Halm |
| 2005/0044011 A1 | 2/2005 | Deal |
| 2005/0149216 A1* | 7/2005 | Popplewell ............ G05B 19/12 700/96 |
| 2005/0223032 A1 | 10/2005 | Shan et al. |
| 2005/0228708 A1 | 10/2005 | Catala et al. |
| 2005/0278062 A1 | 12/2005 | Janert et al. |
| 2006/0106682 A1 | 5/2006 | Van Dyck et al. |
| 2006/0119601 A1 | 6/2006 | Finlayson et al. |
| 2007/0013709 A1 | 1/2007 | Charles et al. |
| 2007/0106410 A1 | 5/2007 | Bouffiou et al. |
| 2007/0106414 A1 | 5/2007 | Strohband et al. |
| 2007/0219645 A1 | 9/2007 | Thomas et al. |
| 2008/0052046 A1* | 2/2008 | Botvinnik ............ G06F 17/5004 703/1 |
| 2008/0140270 A1 | 6/2008 | Davis et al. |
| 2008/0187897 A1 | 8/2008 | Franzen et al. |
| 2008/0205763 A1 | 8/2008 | Marsh et al. |
| 2008/0209342 A1 | 8/2008 | Taylor |
| 2008/0234850 A1 | 9/2008 | Bowling et al. |
| 2008/0252311 A1 | 10/2008 | Koh et al. |
| 2008/0294395 A1 | 11/2008 | Lu |
| 2008/0301012 A1 | 12/2008 | Cogswell et al. |
| 2009/0013281 A1 | 1/2009 | Helfman et al. |
| 2009/0112349 A1 | 4/2009 | Cobb |
| 2009/0138230 A1 | 5/2009 | Davies et al. |
| 2009/0144962 A1 | 6/2009 | Hardouin-Finez |
| 2009/0192644 A1 | 7/2009 | Meyer et al. |
| 2009/0228133 A1 | 9/2009 | Loda |
| 2009/0248545 A1 | 10/2009 | Robinson et al. |
| 2009/0312897 A1 | 12/2009 | Jamrosz et al. |
| 2010/0010794 A1 | 1/2010 | Sweers |
| 2010/0097195 A1 | 4/2010 | Majoros et al. |
| 2010/0114641 A1 | 5/2010 | Coffman et al. |
| 2010/0125468 A1 | 5/2010 | Avery et al. |
| 2010/0161095 A1 | 6/2010 | Lindgren |
| 2010/0175013 A1 | 7/2010 | Krauter et al. |
| 2010/0299304 A1 | 11/2010 | Vasudevan |
| 2011/0022208 A1 | 1/2011 | Bouffiou et al. |
| 2011/0041088 A1 | 2/2011 | Mason et al. |
| 2011/0046763 A1 | 2/2011 | Tsuchiya et al. |
| 2011/0087466 A1 | 4/2011 | Vossmann |
| 2011/0087513 A1 | 4/2011 | Floyd et al. |
| 2011/0125303 A1 | 5/2011 | Rollman et al. |
| 2011/0137443 A1 | 6/2011 | Farahani |
| 2011/0166824 A1 | 7/2011 | Hasity et al. |
| 2011/0169924 A1* | 7/2011 | Haisty et al. ............... 348/51 |
| 2011/0172795 A1 | 7/2011 | Hansen et al. |
| 2011/0251711 A1 | 10/2011 | Goel |
| 2011/0288840 A1 | 11/2011 | Kropinski et al. |
| 2011/0311097 A1 | 12/2011 | Kitagawa et al. |
| 2012/0007852 A1* | 1/2012 | Morate et al. ............... 345/419 |
| 2012/0030926 A1 | 2/2012 | Toh et al. |
| 2012/0050522 A1 | 3/2012 | Van Slyck et al. |
| 2012/0062725 A1 | 3/2012 | Wampler, II et al. |
| 2012/0071998 A1 | 3/2012 | Davies et al. |
| 2012/0075343 A1 | 3/2012 | Chen et al. |
| 2012/0100520 A1 | 4/2012 | Jo et al. |
| 2012/0130521 A1 | 5/2012 | Kohlhoff |
| 2012/0140041 A1 | 6/2012 | Burgunder et al. |
| 2012/0249588 A1 | 10/2012 | Tison et al. |
| 2012/0303336 A1 | 11/2012 | Becker et al. |
| 2012/0304059 A1* | 11/2012 | McCloskey ............... 715/709 |
| 2012/0306666 A1 | 12/2012 | Xu et al. |
| 2013/0006409 A1 | 1/2013 | Evans et al. |
| 2013/0036031 A1 | 2/2013 | Hutchinson et al. |
| 2013/0124150 A1 | 5/2013 | Kim et al. |
| 2013/0132373 A1 | 5/2013 | Huang et al. |
| 2013/0239330 A1 | 9/2013 | Newlin et al. |
| 2013/0261876 A1* | 10/2013 | Froom ............... B64F 5/0045 701/29.3 |
| 2013/0297633 A1 | 11/2013 | Edwards |
| 2014/0013263 A1 | 1/2014 | Bailiang |
| 2014/0089030 A1 | 3/2014 | Bell |
| 2015/0062123 A1 | 3/2015 | Yuen |
| 2015/0134274 A1 | 5/2015 | Froom |

FOREIGN PATENT DOCUMENTS

| | | |
|---|---|---|
| EP | 1321869 A2 | 6/2003 |
| EP | 2052807 A1 | 4/2009 |
| EP | 2431915 A2 | 3/2012 |
| EP | 2458562 A1 | 5/2012 |
| EP | 2790136 A1 | 10/2014 |
| GB | 2327289 A | 1/1999 |
| JP | 2007095039 A | 4/2007 |
| WO | WO0049544 A2 | 8/2000 |
| WO | WO2008144797 A1 | 12/2008 |
| WO | WO2011056196 A1 | 5/2011 |
| WO | WO2012166545 A2 | 12/2012 |
| WO | WO2013078156 A1 | 5/2013 |
| WO | WO2013078265 A1 | 5/2013 |

OTHER PUBLICATIONS

International Search Report and Written Opinion, dated Nov. 19, 2014, regarding Application No. PCT/US2014/011196, 10 pages.

(56) References Cited

OTHER PUBLICATIONS

International Search Report and Written Opinion, dated Dec. 1, 2014, regarding Application No. PCT/US2014/031030, 9 pages.
Extended European Search Report, dated Dec. 3, 2014, regarding Application No. 14170988.1, 7 pages.
Office Action, dated Dec. 17, 2014, regarding U.S. Appl. No. 13/780,109, 37 pages.
Gass et al., "Locator System for Three-Dimensional Visualization," U.S. Appl. No. 13/855,102, filed Apr. 2, 2013, 87 pages.
Senesac et al., "Condition of Assembly Visualization System Based on Build Cycles," U.S. Appl. No. 13/835,262, filed Mar. 15, 2013, 79 pages.
Senesac et al., "Shop Order Status Visualization System," U.S. Appl. No. 13/785,616, filed Mar. 5, 2013, 98 pages.
Senesac, "Condition of Assembly Visualization System," U.S. Appl. No. 13/834,893, filed Mar. 15, 2013, 73 pages.
Senesac, "Nonconformance Visualization System," U.S. Appl. No. 13/798,964, filed Mar. 13, 2013, 84 pages.
Senesac, "Object Visualization System," U.S. Appl. No. 13/780,109, filed Feb. 28, 2013, 61 pages.
Senesac, "Shop Order Status Visualization System," U.S. Appl. No. 13/858,364, filed Apr. 8, 2013, 108 pages.
Senesac et al., "Aircraft Comparison System," U.S. Appl. No. 13/860,126, filed Apr. 10, 2013, 103 pages.
Senesac et al., "Nonconformance Visualization System," U.S. Appl. No. 13/861,678, filed Apr. 12, 2013, 116 pages.
Prazak et al., "Visualization of an Object Using a Visual Query System," U.S. Appl. No. 13/852,063, filed Mar. 28, 2013, 50 pages.
Senesac et al., "Aircraft Comparison System with Synchronized Displays," U.S. Appl. No. 13/922,411, filed Jun. 20, 2013, 120 pages.
International Search Report and Written Opinion, dated Apr. 25, 2014, regarding Application No. PCT/US2014/010912, 10 pages.
Extended European Search Report, dated Jun. 2, 2014, regarding Application No. 14160787.9, 6 pages.
"Notice from the European Patent Office dated Oct. 1, 2007 concerning business methods," Official Journal EPO, Nov. 2007, pp. 592-593.
Senesac, "Serial Number Control Visualization System," U.S. Appl. No. 14/467,706, filed Aug. 25, 2014, 113.
Extended European Search Report, dated Jul. 17, 2014, regarding Application No. 14162481.7, 5 pages.
Extended European Search Report, dated Jul. 23, 2014, regarding Application No. 14157597.7, 7 pages.
Extended European Search Report, dated Aug. 22, 2014, regarding Application No. EP14159832.6, 9 pages.
Non-Patent Literature including images from the website www.aso.com, as published on Jan. 16, 2013 based on captures in the Internet Archive tool referred to as the WayBackMachine, http://web.archive.org/web/20130116040904/http://www.aso.com/ ("NP1"), in Final Office Action dated Mar. 27, 2015, 3 pages.
"Marianna Airmotive Uses a FARO Laser Tracker to Reduce Repair Turnaround Time dramatically," Mar. 7, 2015, 2 pages. http://www.mariannaairmotive.com.
"What's New in SolidWorks," SolidWorks, Version 2010, 199 pages. http://files.solidworks.com/Supportfiles/Whats_new/2010/English/whatsnew.pdf.
Final Office Action, dated Mar. 27, 2015, regarding U.S. Appl. No. 13/780,109, 18 pages.
Office Action, dated Feb. 26, 2015, regarding U.S. Appl. No. 13/858,364, 32 pages.
Notice of Allowance, dated Apr. 13, 2015, regarding U.S. Appl. No. 13/858,364, 5 pages.
Office Action, dated Feb. 27, 2015, regarding U.S. Appl. No. 13/834,893, 41 pages.
Office Action, dated Mar. 4, 2015, regarding U.S. Appl. No. 13/855,102, 28 pages.
Office Action, dated Apr. 12, 2015, regarding U.S. Appl. No. 13/798,964, 39 pages.
Office Action, dated May 5, 2015, regarding U.S. Appl. No. 13/861,678, 48 pages.
Office Action, dated May 6, 2015, regarding U.S. Appl. No. 13/852,063, 39 pages.
Australian Government Patent Examination Report No. 1, dated Mar. 18, 2015, regarding Application No. 2014200514, 4 pages.
Candadian Intellectual Property Office Examination Search Report, dated Mar. 24, 2015, regarding Application No. 2,840,798, 6 pages.
Australian Government Patent Examination Report No. 1, dated Mar. 27, 2015, regarding Application No. 2014200292, 3 pages.
Canadian Intellectual Property Office Examination Search Report, dated Apr. 15, 2015, regarding Application No. 2,839,913, 4 pages.
Notice of Allowance, dated Jun. 22, 2015, regarding U.S. Appl. No. 13/834,893, 24 pages.
Final Office Action, dated Jun. 26, 2015, regarding U.S. Appl. No. 13/855,102, 18 pages.
Office Action, dated Jun. 29, 2015, regarding U.S. Appl. No. 13/922,411, 43 pages.
Australian Government Patent Examination Report No. 2, dated Jul. 8, 2015, regarding Application No. 2014200514, 3 pages.
Australian Government Patent Examination Report No. 3, dated Aug. 13, 2015, regarding Application No. 2014200514, 4 pages.
Australian Government Patent Examination Report No. 2, dated Jul. 30, 2015, regarding Application No. 2014200292, 5 pages.
International Preliminary Report on Patentability, dated Sep. 1, 2015, regarding Application No. PCT/US2014/010912, 6 pages.
Office Action, dated Sep. 17, 2015, regarding U.S. Appl. No. 13/780,109, 47 pages.
Office Action, dated Jul. 24, 2015, regarding U.S. Appl. No. 13/785,616, 55 pages.
Office Action, dated Sep. 21, 2015, regarding U.S. Appl. No. 13/835,262, 41 pages.
Final Office Action, dated Sep. 4, 2015, regarding U.S. Appl. No. 13/861,678, 27 pages.
Final Office Action, dated Oct. 22, 2015, regarding U.S. Appl. No. 13/852,063, 30 pages.
Office Action, dated Sep. 29, 2015, regarding U.S. Appl. No. 13/860,126, 34 pages.
Final Office Action, dated Jul. 31, 2015, regarding U.S. Appl. No. 13/922,411, 23 pages.
Final Office Action, dated Dec. 2, 2015, regarding U.S. Appl. No. 13/785,616, 38 pages.
Roh et al., "An object-based 3D walk-through model for interior construction progress monitoring", May 3, 2010, Elsevier, Automation in construction 20, pp. 66-75.
Prazak et al., "Visualization of an Object Using a Visual Query System," U.S. Appl. No. 15/003,802, filed Jan. 22, 2016, 49 pages.
Final Office Action, dated Jan. 25, 2016, regarding U.S. Appl. No. 13/780,109, 54 pages.
Extended European Search Report, dated Jun. 17, 2016, regarding Application No. EP15176304.2, 9 pages.
Office Action, dated Jan. 15, 2015, regarding U.S. Appl. No. 13/861,678, 37 pages.
Slack et al., "Non-Conformance Mapping and Visualization," U.S. Appl. No. 15/056,536, filed Feb. 29, 2016, 43 pages.
Office Action, dated Jan. 15, 2016, regarding U.S. Appl. No. 13/798,964, 36 pages.
Final Office Action, dated Feb. 9, 2016, regarding U.S. Appl. No. 13/835,262, 32 pages.
Office Action, dated Mar. 28, 2016, regarding U.S. Appl. No. 13/835,262, 21 pages.
Office Action, dated Jul. 27 2016, regarding U.S. Appl. No. 13/785,616 , 59 pages.
Notice of Allowance, dated Jun. 24, 2016, regarding U.S. Appl. No. 13/835,262 , 19 pages.
Office Action, dated Jul. 8, 2016 regarding U.S. Appl. No. 14/467,706 , 94 pages.
Extended European Search Report, dated Nov. 18, 2015, regarding Application No. EP14159752.6, 6 pages.
Australian Government Patent Examination Report No. 2, dated Oct. 29, 2015, regarding Application No. 2014200304, 4 pages.
Canadian Intellectual Property Office Examination Search Report, dated Oct. 28, 2015, regarding Application No. 2,839,914, 5 pages.

(56) References Cited

OTHER PUBLICATIONS

Australian Government Patent Examination Report No. 1, dated May 13, 2015, regarding Application No. 2014200304, 4 pages.
Canadian Intellectual Property Office Examination Search Report, dated Feb. 17, 2015, regarding Application No. 2,839,914, 6 pages.
European Patent Office Communcation, dated Sep. 15, 2015, regarding Application No. 14157597.7, 7 pages.
Notices of Reasons for Rejection and English Translation, issued Sep. 8, 2015, regarding Japanese Patent Application No. 2014-060864, 5 pages.
Kokogawa et al., "Wide-Area Contents Distribution based on Cooperation among Digital Libraries," Information Processing Academic Society Research Report, Mar. 10, 2000, vol. 2000, No. 26, pp. 83-88.
Final Office Action, dated May 6, 2016, regarding U.S. Appl. No. 13/861,678, 33 pages.
European Patent Office Communication, dated Jan. 26, 2016, regarding Application No. 14159760.9, 5 pages.
Notices of Reasons for Rejection and English Translation, issued Jan. 29, 2016, regarding Japanese Patent Application No. 2014-060864, 7 pages.
Canadian Intellectual Property Office Examination Search Report, dated Aug. 28, 2016, regarding Application No. 2,839,914, 6 pages.
Japanese Preliminary Examination Report, dated Aug. 5, 2016, regarding Application No. 2014-060864, 9 pages.
European Patent Office Examination Report, dated Oct. 14, 2016 regarding Application No. 14160787.9, 6 pages.
Notice of Allowance, dated Oct. 4, 2016, regarding U.S. Appl. No. 13/798,964, 51 pages.
Final Office Action, dated Oct. 20, 2016, regarding U.S. Appl. No. 13/785,616, 43 pages.
Final Office Action, dated Oct. 13, 2016, regarding U.S. Appl. No. 14/467,706, 28 pages.
Office Action, dated Dec. 14, 2016, regarding U.S. Appl. No. 13/861,678, 29 pages.
Extended European Search Report, dated Feb. 7, 2017, regarding Application No. 14725826.3, 8 pages.
State Intellectual Property Office of PRC Notification of First Office Action, dated Nov. 30, 2016, regarding Application No. 201480025761.0, 11 pages.
Office Action, dated Mar. 23, 2017, regarding U.S. Appl. No. 13/785,616, 35 pages.
Final Office Action, dated Apr. 20, 2017, regarding U.S Appl. No. 13/861,678, 23 pages.
Office Action, dated Mar. 31, 2017, regarding U.S. Appl. No. 13/922,411, 31 pages.
Office Action, dated Apr. 18, 2017, regarding U.S. Appl. No. 15/056,536, 76 pages.
Notice of Allowance, dated Sep. 7, 2017, regarding U.S. Appl. No. 13/785,616, 28 pages.
Final Office Action, dated Jul. 19, 2017, regarding U.S. Appl. No. 13/922,411, 23 pages.
European Patent Office Examination Report, dated Jun. 28, 2017, regarding Application No. 14702979.7, 7 pages.
Final Office Action, dated Oct. 26, 2017, regarding U.S. Appl. No. 15/056,536, 30 pages.

\* cited by examiner

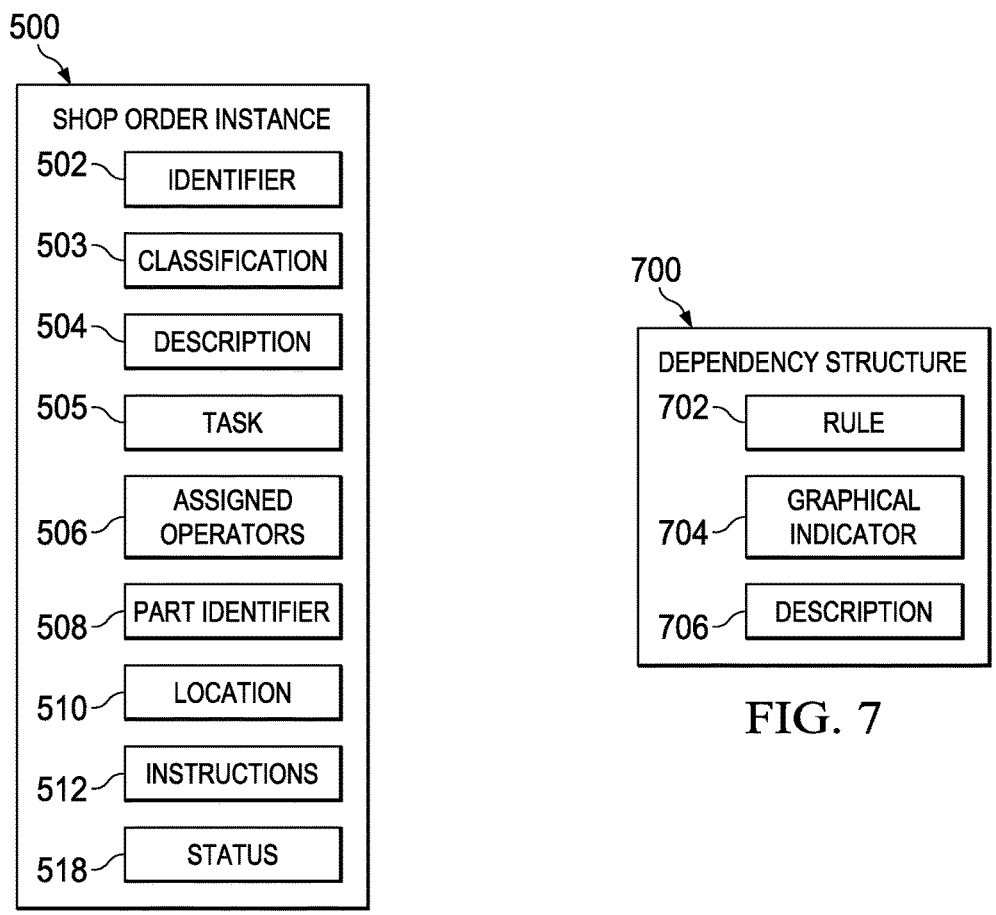
FIG. 5
FIG. 7
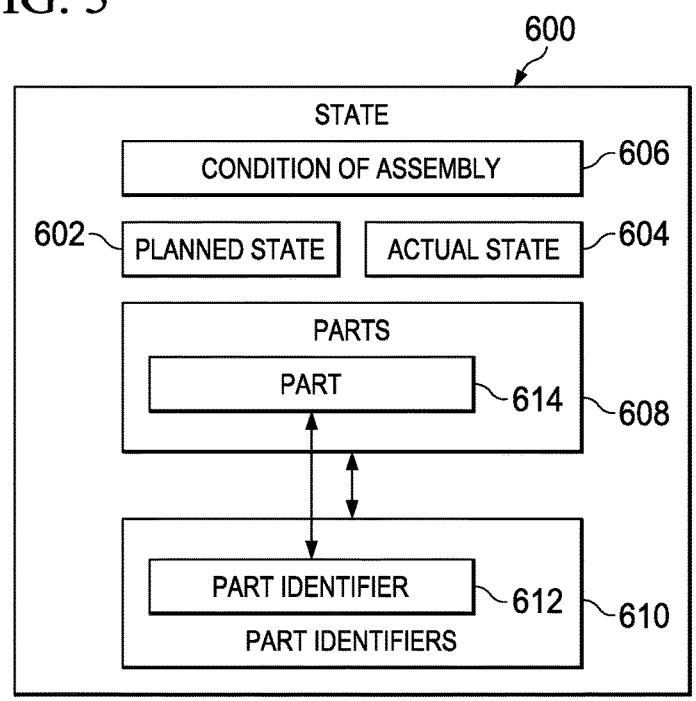
FIG. 6

FIG. 24
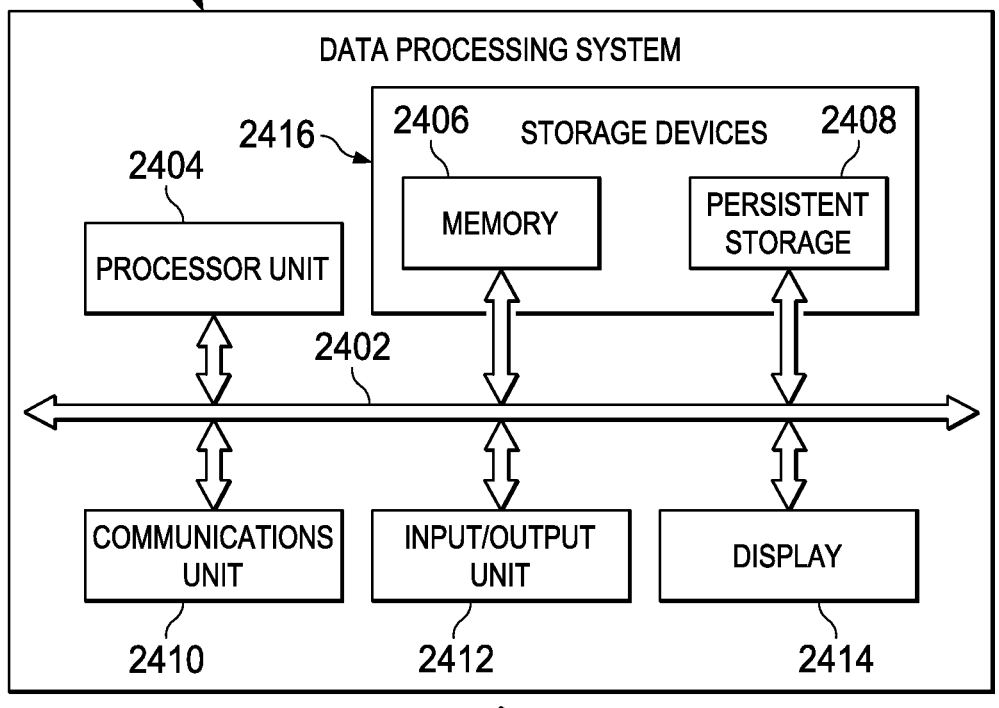
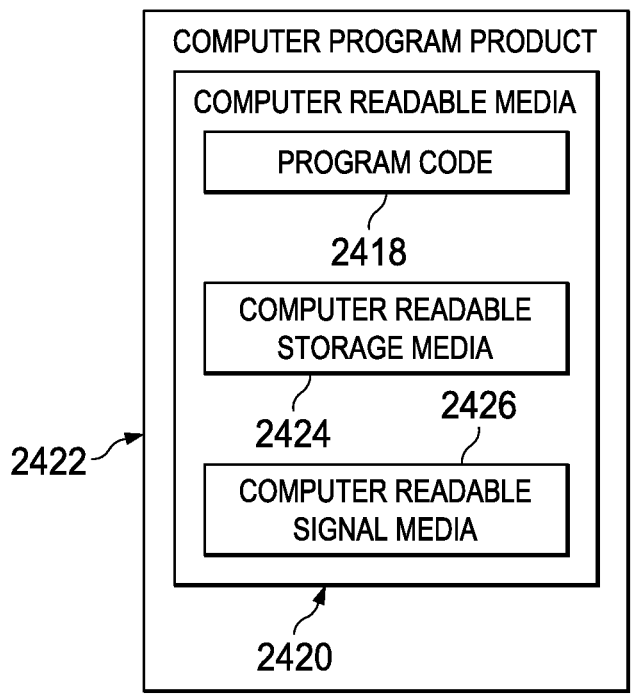

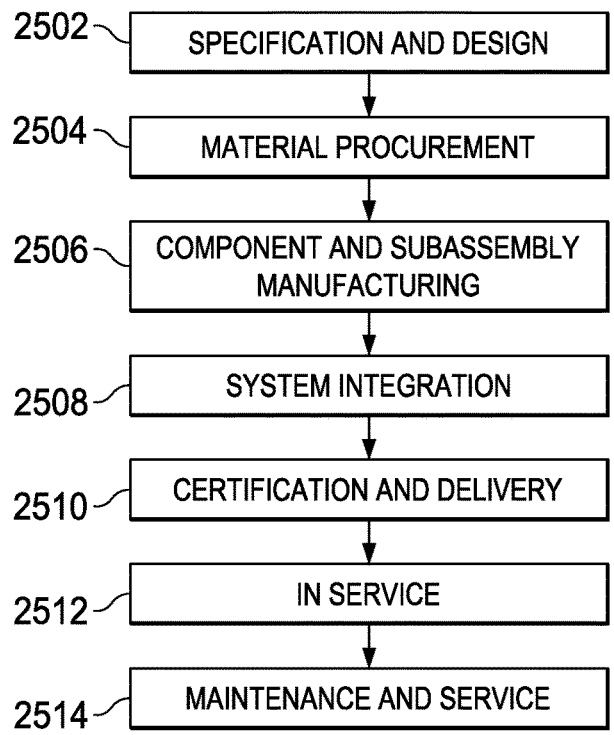
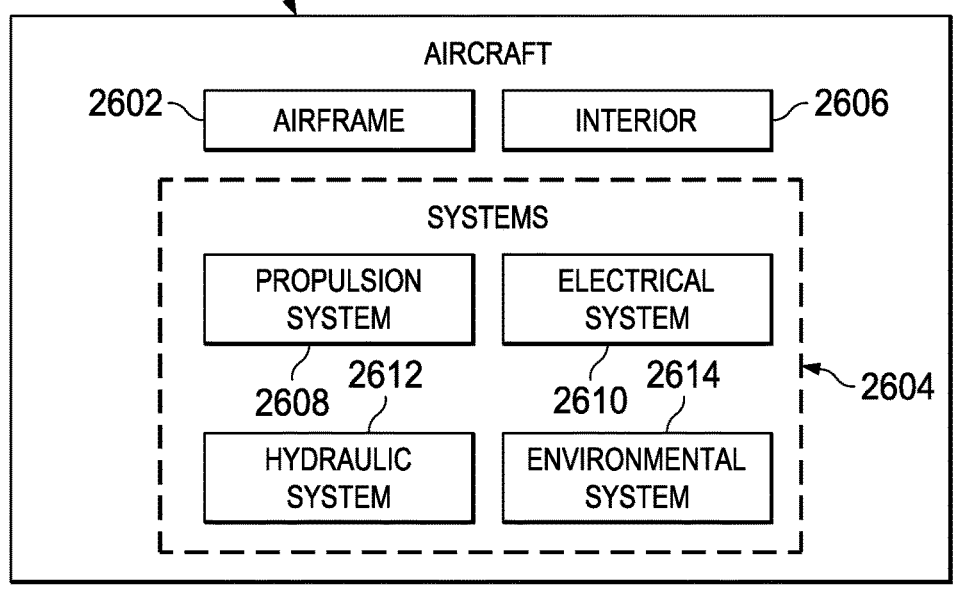

SHOP ORDER STATUS VISUALIZATION SYSTEM

CROSS-REFERENCE TO RELATED APPLICATIONS

This application is related to the following patent applications: entitled "Object Visualization System," Ser. No. 13/780,109, filed Feb. 28, 2013; entitled "Shop Order Status Visualization System," Ser. No. 13/785,616, filed Mar. 5, 2013; entitled "Nonconformance Visualization System," Ser. No. 13/798,964, filed Mar. 13, 2013; entitled "Condition of Assembly Visualization System," Ser. No. 13/834,893, filed Mar. 15, 2013; entitled "Condition of Assembly Visualization System based on Build Cycles," Ser. No. 13/835,262, filed Mar. 15, 2013; entitled "Visualization of an Object Using a Visual Query System," Ser. No. 13/852,063, filed Mar. 28, 2013; entitled "Locator System for Three-Dimensional Visualization," Ser. No. 13/855,102, filed Apr. 2, 2013; entitled "Shop Order Status Visualization System," Ser. No. 13/858,364, filed Apr. 8, 2013; entitled "Nonconformance Visualization System," Ser. No. 13/861,678, filed Apr. 12, 2013; and entitled "Aircraft Comparison System," Ser. No. 13/860,126, filed Apr. 10, 2013, assigned to the same assignee, and incorporated herein by reference.

BACKGROUND INFORMATION

1. Field

The present disclosure relates generally to manufacturing and, in particular, to manufacturing vehicles. Still more particularly, the present disclosure relates to a method and apparatus for assembling vehicles in a manufacturing environment.

2. Background

The assembly of an aircraft is an extremely complex process. Hundreds of thousands of parts may be assembled for an aircraft.

The assembly of an aircraft may involve manufacturing different parts of the aircraft in geographically diverse locations. These different parts may then be finally assembled in a single location. For example, different portions of a fuselage of a composite aircraft may be assembled in different locations and flown to a central location where the final assembly line is located. Additionally, other parts such as engines, auxiliary power units, seats, computer systems, line replaceable units, or other components in aircraft may be shipped to this final location for assembly to form the assembled aircraft.

The assembly of the different parts involves assigning tasks to different operators. The assignment of these tasks may take the form of shop order instances. Each shop order instance may include instructions and an identification of parts for a particular assembly in the aircraft.

Operators performing the assembly of an aircraft use shop order instances to determine what tasks they will perform on a daily basis. For example, an operator may identify a task to perform in a shop order instance. The shop order instance identifies the parts to be assembled, work instructions for assembling the parts, and a location where the assembly should be performed.

When an operator identifies a shop order instance assigned to that operator, the operator then identifies the different parts for assembly. Currently, the operator is unable to identify the context of other parts in the aircraft with respect to the part to be assembled. In other words, the operator is not shown the location on the aircraft for the parts to be assembled. Further, the operator is also unable to view other parts that may already be located on the aircraft. In some cases, the assembly of the parts assigned to the operator may depend on the prior assembly of other parts in the aircraft.

Currently, the identification of the location in the shop order instance often takes the form of coordinates in an aircraft. Based on these coordinates, the operator may perform research in databases and computer-aided design models to identify where the assembly should occur. This process may be more time-consuming than desired. Further, it may be difficult to resolve the location information to an actual location on the plane. The increased amount of time may increase the time to assemble an aircraft more than desired. As a result, the number of aircraft that are produced during a period of time may not be as great as desired or those aircraft may be assembled at a greater cost than desired.

Therefore, it would be desirable to have a method and apparatus that takes into account at least some of the issues discussed above, as well as other possible issues.

SUMMARY

In one illustrative embodiment, a method for visualizing an assembly of parts for an aircraft is presented. A shop order instance is identified for the assembly of parts for the aircraft. A volume is identified for the shop order instance. The assembly of parts is displayed within the volume in context with a number of assemblies of other parts within the volume.

In another illustrative embodiment, a method for visualizing an assembly of parts for an object is presented. A shop order instance is identified for the assembly of parts for the object. A volume is identified for the shop order instance. The assembly of parts is displayed within the volume in context with a number of assemblies of other parts within the volume.

In yet another illustrative embodiment, an aircraft management system comprises an object manager configured to identify a shop order instance for an assembly of parts for an aircraft. The object manager is further configured to identify a volume for the shop order instance. The object manager is still further configured to display the assembly of parts within the volume in context with a number of assemblies of other parts within the volume.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a block diagram of a shop order instance in accordance with an illustrative embodiment;

FIG. 6 is an illustration of a block diagram of a state for a section of an aircraft in accordance with an illustrative embodiment;

FIG. 7 is an illustration of a block diagram of a dependency structure in accordance with an illustrative embodiment;

FIG. 24 is an illustration of a block diagram of a data processing system in accordance with an illustrative embodiment;

FIG. 25 is an illustration of a block diagram of an aircraft manufacturing and service method in accordance with an illustrative embodiment;

FIG. 26 is an illustration of a block diagram of an aircraft in which an illustrative embodiment may be implemented.

DETAILED DESCRIPTION

Figure 1:
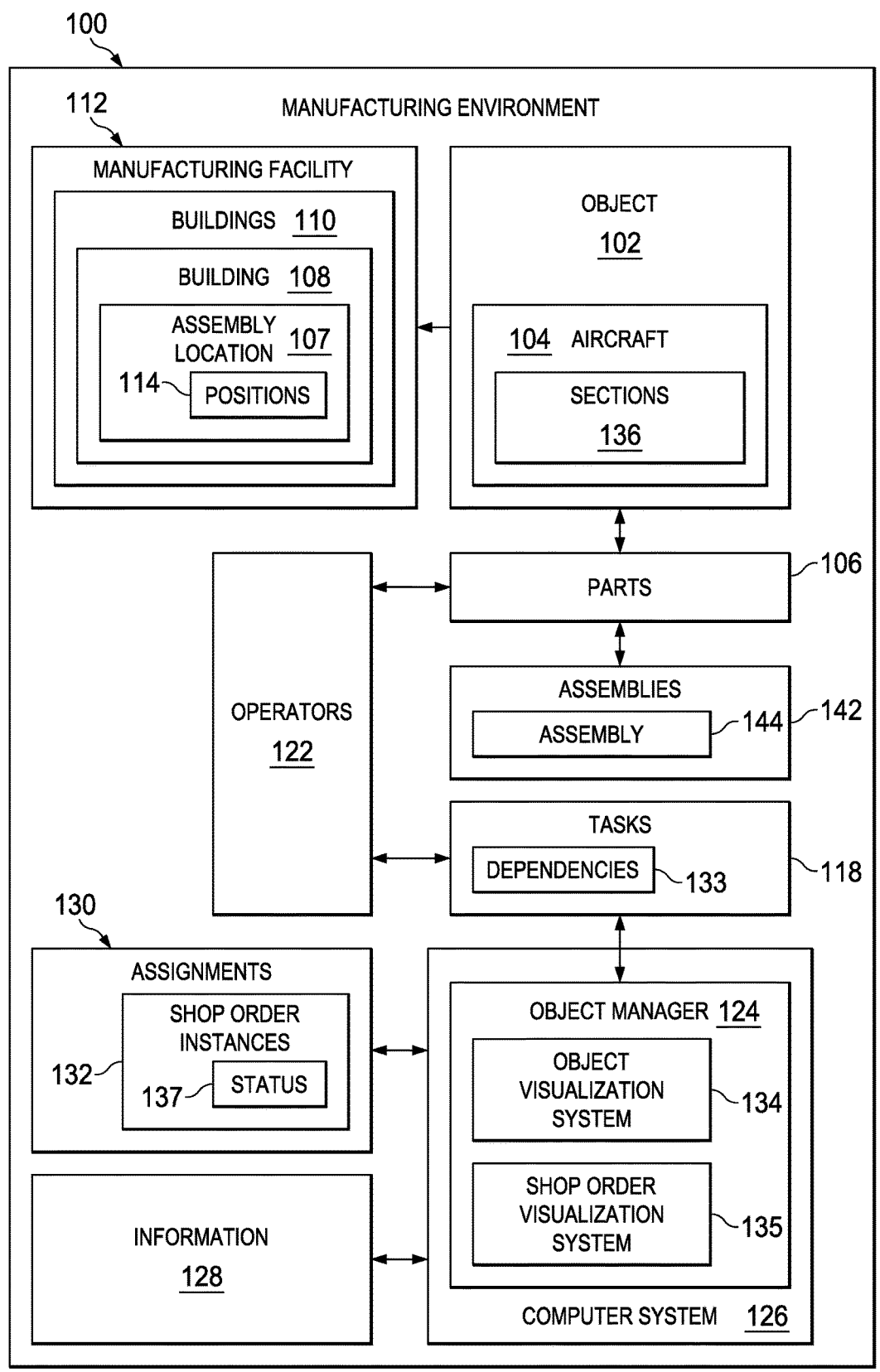
FIG. 1 is an illustration of a block diagram of a manufacturing environment in accordance with an illustrative embodiment.

The illustrative embodiments recognize and take into account one or more different considerations. For example, the illustrative embodiments recognize and take into account that in performing tasks in shop order instances, some shop order instances should be completed prior to other shop order instances. The illustrative embodiments recognize and take into account that in some cases, completing one shop order instance before another may require some disassembly or rework of parts.

For example, the completion of one assembly may block installation of another assembly in the aircraft. In another case, one assembly may be attached to the second assembly, requiring the second assembly to be completed.

Further, the illustrative embodiments also recognize and take into account that the assembly of parts in the aircraft may not always be performed in a desired sequence. Additionally, a part may have an inconsistency that may be caused by an operator or the part may have been received with the inconsistency. As a result, the part may be installed and other parts also may be installed prior to identifying the inconsistency. As a result, the order of the assignment of installations may change and cause confusion to an operator installing other parts.

As another example, inspections of assembly may need to be performed before another assembly is completed. For example, installation of a second assembly may block access to the first assembly such that inspection of the first assembly may be difficult or impossible to perform. As a result, the inspection may be performed after partial or full removal of the second assembly. The second assembly is then reinstalled after the inspection.

The illustrative embodiments recognize and take into account that currently, operators may see a list of shop order instances and whether they have been completed. With respect to shop order instances, an operator assigned a shop order instance may see a list of parts for the shop order assembly. Further, the operator also may see instructions to assemble the parts to form the assembly for the shop order instance.

However, the illustrative embodiments recognize and take into account that currently, an operator is unable to visualize the different tasks performed to assemble parts to form an assembly for a shop order instance. In other words, operators are currently unable to see the geometry of the parts that form the assembly for a shop order instance. In addition, the operator is also currently unable to easily see the assembly within the context of other parts that may be present in the aircraft. As a result, this inefficiency may increase the amount of time needed to assemble an aircraft more than desired.

Thus, the illustrative embodiments provide a method and apparatus for visualizing an assembly of parts. An identification of a shop order instance is received for the assembly of parts. A volume is identified for the shop order instance. The assembly of parts within the volume is displayed in context with other parts within the volume.

With reference now to the figures, and in particular, with reference to FIG. 1, an illustration of a block diagram of a manufacturing environment is depicted in accordance with an illustrative embodiment. Manufacturing environment 100 is an example of an environment in which object 102 may be assembled.

In this illustrative example, object 102 takes the form of aircraft 104. Object 102 is completed by assembling parts 106. A part is a group of the components. As used herein, a "group of," when used with reference items, means one or more items. For example, a group of components is one or more components.

A part may be a single component or assembly of components in these depicted examples. For example, the part may be a seat, a row of seats, an in-flight entertainment system, a duct, a system of ducts, a global positioning system receiver, an engine, an engine housing, an inlet, or other suitable types of parts.

In this illustrative example, assembling parts 106 may take place in assembly location 107 in building 108 of buildings 110 at manufacturing facility 112. The assembly of parts 106 in building 108 may occur in positions 114 in assembly location 107 for object 102. Each position in positions 114 is a location in building 108 in which a group of tasks 118 is performed to assemble object 102.

In these illustrative examples, a task is a piece of work. A task may be comprised of one or more operations that are performed by a group of operators 122 assigned to work on the assembly of object 102.

In the illustrative examples, object manager 124 may be used to manage the assembly of object 102. When object 102 is aircraft 104, object manager 124 may be part of an aircraft management system. Object manager 124 may be implemented in software, hardware, firmware, or a combination thereof. When software is used, the operations performed by object manager 124 may be implemented in program code configured to run on a processor unit. When firmware is used, the operations performed by object manager 124 may be implemented in program code and data and stored in persistent memory to run on a processor unit. When hardware is employed, the hardware may include circuits that operate to perform the operations in object manager 124.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, or other suitable hardware devices. Additionally, the processes may be implemented in organic components integrated with inorganic components and/or may be comprised entirely of organic components excluding a human being. For example, the processes may be implemented as circuits in organic semiconductors.

As depicted, object manager 124 may be implemented in computer system 126. Computer system 126 is one or more computers. When more than one computer is present, the computers in computer system 126 may communicate with each other using a communications medium such as a network. Computer system 126 may be located all in the same location or in different geographic locations. For example, computer system 126 may be distributed through buildings 110 or located in building 108. Portions of computer system 126 may even be located in another geographic location separate from manufacturing facility 112.

In managing the assembly of object 102, object manager 124 may manage tasks 118 and information 128 about object 102. In the illustrative example, the management of tasks 118 may include at least one of assigning tasks 118 to operators 122, monitoring the status of tasks 118, organizing tasks 118, providing information about tasks 118, or other suitable operations. Information 128 may include, for example, the models of objects, part inventories, or other suitable information relating to object 102.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

In these illustrative examples, object manager 124 may manage tasks 118 using assignments 130 in the form of shop order instances 132. For example, object manager 124 may assign tasks through the use of shop order instances 132 to operators 122 for performance and assembling of object 102. Additionally, the status of shop order instances 132 may be used to identify the state of assembly of object 102 by operators 122.

Shop order instances 132 may include various types of operations. For example, shop order instances 132 may include when particular parts in parts 106 should be assembled, when inspections of parts 106 assembled in object 102 should be made, or other suitable types of operations. As another example, other operations may include rework of one or more parts 106 assembled in object 102.

Additionally, tasks 118 may have dependencies 133. In other words, tasks 118 may be performed in a particular order. Dependencies 133 may dictate when tasks within tasks 118 should be performed relative to other tasks in tasks 118. Dependencies may also be for parts 106 in addition to or in place of tasks 118. In this form, dependencies 133 may result in dependencies 133 for tasks 118.

As a result, dependencies 133 may affect the manner in which assignments 130 are made as shop order instances 132. In particular, dependencies 133 may be used to determine when shop order instances 132 should be performed.

In these illustrative examples, object manager 124 may provide different functions and capabilities for assembling object 102. For example, object manager 124 may include at least one of object visualization system 134, shop order visualization system 135, or other types of systems. The systems may be implemented using hardware, software, or some combination thereof.

In one illustrative example, object visualization system 134 may provide a visualization of object 102 to operators 122. In particular, operators 122 may perform queries using object visualization system 134 to view a number of sections 136 in object 102. In particular, sections 136 may be sections that correspond to sections at manufacturing facility 112 for assembly of object 102, such as aircraft 104.

In these illustrative examples, the manufacturing may include at least one of fabricating components for parts, assembling components to form parts, assembling parts for object 102, or some other suitable manufacturing operation performed to assemble object 102.

For example, object manager 124 may provide visual information about all of object 102 or one or more specific sections of object 102. This type of visualization may be especially useful when object 102 takes the form of aircraft 104. Information 128 may be used when operators 122 perform tasks 118 with respect to parts 106 to assemble aircraft 104.

In another illustrative example, shop order visualization system 135 may provide a visualization of status 137 of shop order instances 132. This information may be provided visually to operators 122. In particular, object manager 124 may function as shop order visualization system 135 as well as provide other suitable functions in managing the assembly of object 102.

In some illustrative examples, the visualization of status 137 of shop order instances 132 may be provided with respect to parts 106 present in aircraft 104 for a particular state of aircraft 104. In this manner, operators 122 may visualize parts 106 in aircraft 104 that are actually present for a particular state, such as a particular state along positions in an assembly line for aircraft 104 or other suitable objects. For example, the state may be a current state of aircraft 104 in the location where operators 122 perform tasks 118 to assemble aircraft 104.

Further, shop order visualization system 135 also may provide for a visualization of assemblies 142 of parts 106. This visualization may aid operators 122 in performing assembly of parts 106 for aircraft 104. For example, this visualization may provide context for assembly 144 with respect to assemblies 142 of parts 106 in a particular location within aircraft 104.

Figure 2:
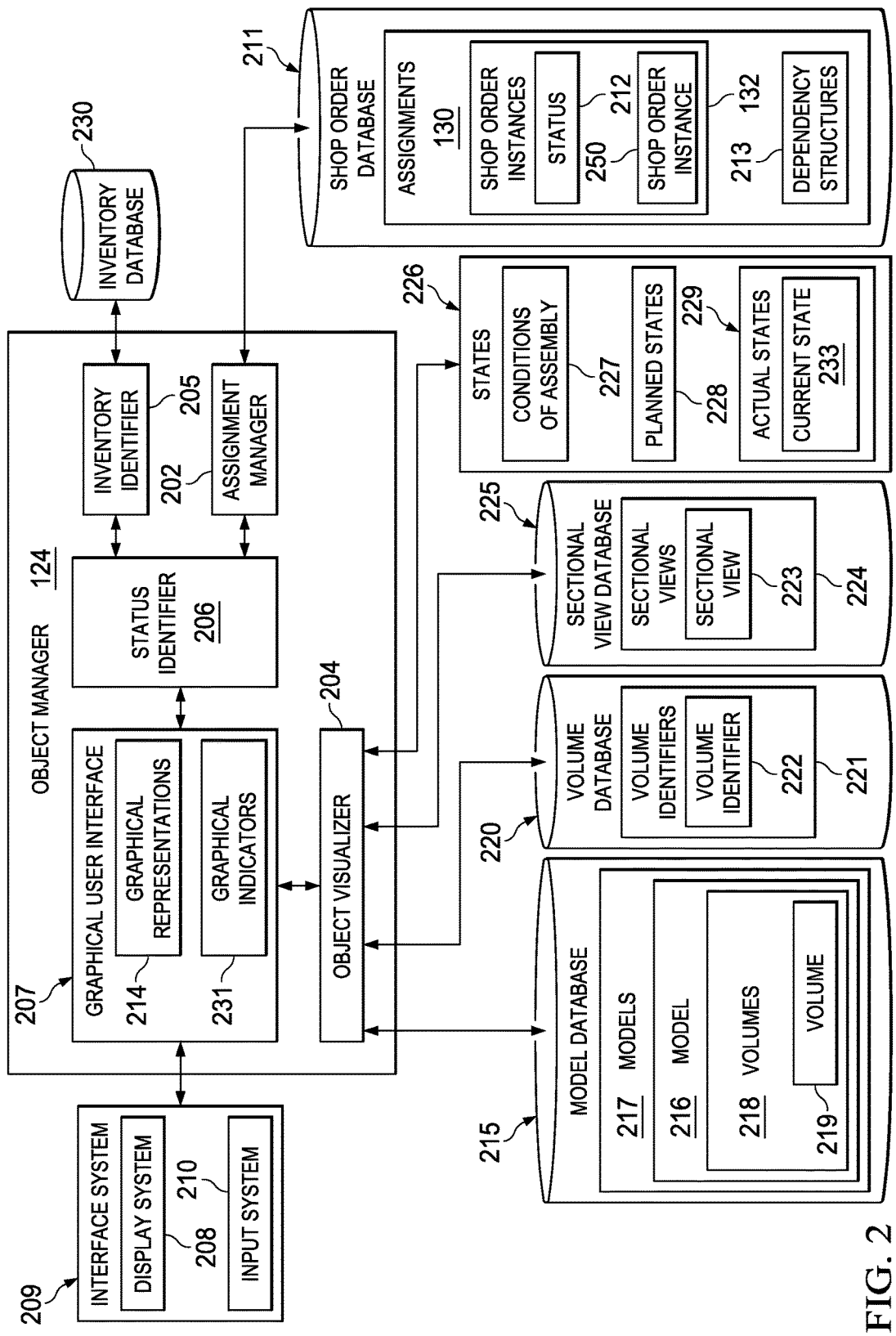
FIG. 2 is an illustration of a block diagram of an object manager in accordance with an illustrative embodiment.

Turning now to FIG. 2, an illustration of a block diagram of an object manager is depicted in accordance with an illustrative embodiment. Examples of components that may be implemented in object manager 124 are shown in this figure.

As depicted, object manager 124 includes a number of different components. For example, object manager 124 includes assignment manager 202, object visualizer 204, inventory identifier 205, status identifier 206, and graphical user interface 207. These different components and object manager 124 may be implemented using hardware, software, or some combination thereof. As used herein, a "number of" when used with reference to items means one or more items. For example, a number of different components means one or more different components.

Graphical user interface 207 is configured to provide an interface for operators 122 to interact with object manager 124. In these illustrative examples, graphical user interface 207 may be displayed on display system 208 in interface system 209. Display system 208 is hardware and may include one or more display devices selected from at least one of a liquid crystal display (LCD), a light emitting display (LED), an organic light emitting display (OLED), or other suitable types of display devices.

Input may be received from operators 122 through input system 210 in interface system 209. In this illustrative example, input system 210 is a hardware system. Input system 210 may include one or more devices. These devices may include at least one of a keyboard, a mouse, a joystick, a touchscreen panel, or other suitable types of devices.

In this illustrative example, assignment manager 202 is configured to manage assignments 130 in the form of shop order instances 132 in shop order database 211. For example, assignment manager 202 may be used to assign tasks 118 to operators 122 using shop order instances 132. Additionally, assignment manager 202 also may be configured to receive information about the performance of tasks 118 assigned through shop order instances 132. This information may be used by assignment manager 202 to generate and update status 212 for shop order instances 132.

Additionally, shop order database 211 also may include dependency structures 213. Dependency structures 213 may be used to describe dependencies 133 between at least one of parts 106 and tasks 118. For example, a first part may need to be installed before a second part is installed. As another example, a first task for installing a part may need to be performed prior to a second task for inspecting the installation of the part. Dependency structures 213 describe these relationships between at least one of parts 106 and tasks 118 for assembling object 102.

Object visualizer 204 is configured to generate graphical representations 214 for parts 106. Graphical representations 214 may be displayed on graphical user interface 207 in display system 208. As depicted, object visualizer 204 is configured to access model database 215. Object visualizer 204 may identify model 216 from models 217 in model database 215 for object 102 and, in particular, for aircraft 104. Model 216 is used to generate graphical representations 214 in this illustrative example.

In these illustrative examples, graphical representations 214 may be generated for sections 136 of object 102, which may take the form of aircraft 104. In this illustrative example, model 216 may be identified for object 102 from models 217 in model database 215. Models 217 may take various forms. For example, without limitation, models 217 may include computer-aided design (CAD) files.

Each model in models 217 may be for a particular object. These objects may be of the same type but used for different instances. For example, models 217 may be for a particular type of aircraft but may be used for a different instance. Each model may be for a particular aircraft that is being assembled for a customer. Further, the different models may be for the same aircraft model but may have variations for different options selected by a customer. In other illustrative examples, models 217 may include models for different types of aircraft 104.

The generation of graphical representations 214 may be based on all of model 216 or a group of volumes 218 in model 216. These items may have different shapes. For example, volume 219 in volumes 218 may be a cube, a cuboid, a cylinder, a sphere, or some other suitable shape. As yet another illustrative example, volume 219 may have an irregular shape.

In these illustrative examples, volume 219 is for at least a portion of a part in parts 106 of object 102. Volume 219 may be large enough to encompass the part. Volume 219 may also be larger than the part. In these illustrative examples, volume 219 may comprise an amount of space around the part for viewing the part in a graphical user interface. For example, the amount of space around the part may be for viewing the part in the graphical user interface from one or more angles. In this example, the one or more angles may be one or more angles from the point of view of an operator. In this example, the point of view of the operator may be of an operator performing a task associated with the part.

In one illustrative example, the identification of volume 219 may be based on the selection of shop order instance 250 in shop order instances 132. In this illustrative example, shop order instance 250 is for assembly 144. In these illustrative examples, assembly 144 is comprised of two or more of parts 106 that are assembled or put together. In this illustrative example, shop order instance 250 may be for the assembly, inspection, rework, or other operations with respect to assembly 144.

As depicted, volume 219 may be for assembly 144 for shop order instance 250. In other words, volume 219 encompasses assembly 144. Further, in the illustrative examples, volume 219 also includes other assemblies within assemblies 142 that may be adjacent to or within some selected distance of assembly 144.

The selected distance may be selected in a number of different ways. For example, the selected distance may be the distance at which other assemblies of parts may affect the manner in which an operator performs the assembly of parts to form an assembly for a particular shop order instance. In other illustrative examples, the selected distance for the volume may be based on preselected distances based on manufacturing specifications, inspection procedures, and other factors.

In the illustrative examples, volume 219 may be identified dynamically when an operator selects shop order instance 250 that includes assembly 144. In other illustrative examples, volume 219 for assembly 144 may be identified and stored within volume database 220. That is, a group of volumes 218 may be identified in model 216 using volume database 220 in which the group of volumes 218 is for assemblies 142 of parts 106 for aircraft 104.

As depicted, a group of volumes 218 may be identified in model 216 using volume database 220. Volume database 220 is a collection of information that may be used to identify which volumes in volumes 218 may be displayed as graphical representations 214. In particular, the collection of information may include volume identifiers 221. For example, volume identifier 222 in volume identifiers 221 may define volume 219 in volumes 218.

In addition to identifying volumes 218 for assemblies 142, the group of volumes 218 also may be identified for other purposes in accordance with an illustrative embodiment. For example, an identification of volume 219 also may be made using sectional view 223 from sectional views 224 in sectional view database 225. In other words, volume 219 corresponds to sectional view 223 of where assembly 144 is located in aircraft 104 in some illustrative examples. Thus, in the illustrative examples, volumes 218 correspond to at least one of sectional views 224, assemblies 142, or other selection standards.

Sectional views 224 may include sectional views of the different objects. For example, sectional view 223 may correspond to model 216. An operator may select the group of volumes 218 using sectional view 223 displayed on graphical user interface 207 in this particular example.

As depicted, sectional views 224 in sectional view database 225 may provide views of sections 136 for object 102. In the illustrative examples, sections 136 correspond to sections as manufactured for assembly of object 102. In particular, sections 136 may correspond to sections as manufactured for assembly of aircraft 104.

Further, sectional views 224 may include different levels of detail. For example, sectional views 224 may include a hierarchy of levels in which the lower levels have more detail about aircraft 104 than higher levels in the hierarchy. In some illustrative examples, a selection of a sectional view in sectional views 224 may result in another sectional view being displayed. In other illustrative examples, a selection made in a sectional view may result in graphical representations 214 being generated from model 216 and displayed on graphical user interface 207. In this manner, an operator may visually query aircraft 104 through the different sectional views in sectional views 224.

As a result, operator interaction generating user input with sectional view 223 displayed in graphical user interface 207 may be used to identify volumes 218 in model 216. The user input may be used to identify volume identifier 222 from volume identifiers 221. Volume identifier 222 may point to volume 219 in model 216.

In these illustrative examples, object visualizer 204 may generate queries using volume identifiers 221 to obtain information from model 216 in model database 215. In particular, information may be data about volume 219 in model 216 for aircraft 104.

As depicted, object visualizer 204 also may be configured to generate graphical representations 214 for states 226 of object 102. In these illustrative examples, states 226 may be used for object 102 in the form of aircraft 104. In other words, aircraft 104 may have different parts in parts 106 that are installed at different states within states 226. In the illustrative examples, states 226 may take the form of conditions of assembly 227 for object 102.

For example, states 226 may be based on positions 114 of aircraft 104 within assembly location 107 in building 108. In these illustrative examples, states 226 may be selected from at least one of planned states 228 or actual states 229.

Aircraft 104 may have different planned states in planned states 228 in different positions in positions 114. In this illustrative example, a planned state in planned states 228 includes the parts that are expected to be installed at a particular position in positions 114. In other words, these parts may or may not have been installed at that position.

In these illustrative examples, the planned state may be based on the past position, current position, or the future position of aircraft 104 in positions 114. In other words, graphical representations 214 may be generated for any position that is present for planned states 228 for aircraft 104.

As depicted, an actual state in actual states 229 includes parts 106 that have actually been installed in aircraft 104. In other words, a particular state may have a selected number of parts that are installed at that state. The actual state in actual states 229 may be based on at least one of a past position or the current position of aircraft 104. In other words, graphical representations 214 may be generated for parts 106 actually installed at a prior point in time. This prior point in time may be selected by an operator. In this manner, an operator may view tasks 118 performed to install parts 106 at some prior point in time.

Additionally, the actual state may be the current state of aircraft 104. In other words, graphical representations 214 may be generated for parts 106 that have been installed at the current point in time. In this manner, graphical representations 214 may be used to visualize parts 106 that are currently present in aircraft 104.

In these illustrative examples, the identification of parts that have already been installed or parts installed in prior points in time may be identified using shop order instances 132. In particular, shop order instances 132 may indicate whether or what parts in parts 106 have been installed.

Model database 215 is a database of models for objects. In these illustrative examples, these models may be, for example, computer-aided design models (CAD). Of course, any type of model that may provide information about the three-dimensional geometries of objects may be used. Additionally, these models may also include other information about materials, instruction assemblies, or other suitable types of information.

As depicted, inventory identifier 205 is configured to access inventory database 230. Inventory database 230 contains information about parts. Inventory database 230 may include information about whether parts are in stock, when parts will be delivered, the number of parts available, or other suitable types of information.

As depicted, status identifier 206 is configured to provide a visualization of the status for one or more of shop order instances 132. In this illustrative example, status identifier 206 is configured to provide an operator a graphical front end through graphical user interface 207 to identify the status of a shop order instance in a specific location of object 102, such as aircraft 104. This information may be identified without the operator knowing the coordinates of the particular location.

In these illustrative examples, object visualizer 204 is configured to identify a model of object 102, such as aircraft 104. For example, object visualizer 204 may identify the model in model database 215 for object 102.

Status identifier 206 is also configured to identify shop order instances 132 for object 102. The identification may be made through interaction with assignment manager 202.

In the illustrative example, status identifier 206 is also configured to identify status 212 of shop order instances 132. This identification also may be made through assignment manager 202.

Object visualizer 204 is configured to display graphical representations 214 of parts 106 in FIG. 1 for a group of shop order instances 132 in graphical user interface 207 on a display device in display system 208. The generation of graphical representations 214 may be based on the identification of a group of shop order instances 132. In other words, object visualizer 204 is configured to receive an identification of parts in the group of shop order instances 132. The identification of these parts may be used to generate graphical representations 214.

In these illustrative examples, object visualizer 204 may display graphical representations 214 for parts 106 for a group of shop order instances 132 for parts 106 that are present in object 102 for a particular state in states 226. In other words, graphical representations 214 of parts 106 may be for parts 106 that are present based on conditions of assembly 227. In particular, when displaying graphical representations 214 for parts 106 for a group of shop order instances 132, parts 106 may be present for an actual state in actual states 229 and includes parts 106 that have actually been installed in aircraft 104. This actual state may be current state 233 of assembly of object 102. This current state may be for a particular position at which shop order instances 132 are being processed for object 102.

In other words, parts 106 that are not present in object 102 at a particular position in positions 114 where shop order instances 132 are performed in that position in positions 114 are not displayed with graphical representations 214 of those parts that are absent. As a result, operators 122 at a particular position in positions 114 performing tasks 118 for shop order instances 132 in that position in positions 114 may see more information about shop order instances 132.

Further, status identifier 206 is also configured to display a set of graphical indicators 231 in association with graphical representations 214 of parts 106 displayed on graphical user interface 207 by object visualizer 204. As used herein, a "set of," when used with reference items, means one or more items. For example, a set of graphical indicators 231 is one or more of graphical indicators 231.

In these illustrative examples, a graphical indicator in graphical indicators 231 is considered to be displayed in association with a graphical representation in graphical representations 214 when the attention of an operator viewing graphical indicators 231 is drawn to the parts. Thus, the graphical indicator may be displayed as part of the graphical representation, on the graphical representation, in some proximity of the graphical representation, or in some other suitable manner that draws attention to the graphical representation.

The set of graphical indicators 231 displayed in association with graphical representations 214 of parts 106 may take different forms. For example, the set of graphical indicators 231 may be selected from at least one of a color, cross hatching, an icon, highlighting, animation, or other suitable types of graphical indicators.

Further, the group of shop order instances 132 may be identified in a number of different ways. For example, the group of shop order instances 132 may be identified by a user input to graphical user interface 207 from an operator. For example, the user input received may be a selection of the group of shop order instances 132.

In another illustrative example, the identification of the group of shop order instances 132 may be identified from a user input selecting a group of parts 106 in object 102 in FIG. 1. The selection of the group of parts 106 may be one of a selection of the group of parts 106 from a list of parts 106 and a selection of the group of parts 106 from a display of graphical representations 214 of parts 106 in graphical user interface 207.

In some illustrative examples, the group of parts 106 may be identified from user input selecting shop order instance 250. With this selection of shop order instance 250, volume 219 is identified and graphical representations 214 for assembly 144 as well as one or more of other assemblies in assemblies 142 within volume 219 may be displayed.

In this manner, the context of assembly 144 for shop order instance 250 with respect to other assemblies in assemblies 142 may be visualized by an operator. Further, an operator also may view assembly 144 without other assemblies 142 within volume 219 in some illustrative examples.

In this manner, an operator may view instructions in shop order instance 250 and have a better visualization of how parts 106 for assembly 144 should be assembled. Additionally, a better visualization also may be provided as to how parts 106 with respect to assembly 144 should be put together with respect to parts 106 for assemblies 142 that are adjacent to or within a selected location of assembly 144.

Additionally, status identifier 206 may display information about a shop order instance for a part selected from graphical representations 214 of parts 106 displayed in graphical user interface 207.

With this information in graphical user interface 207, real-world operations may be performed. For example, the assembly of object 102 in FIG. 1 may be managed based on graphical representations 214 of parts 106 for shop order instances 132 and the set of graphical indicators 231 displayed on graphical user interface 207. For example, identifications of operations that should be performed may be made using this visualization.

In some illustrative examples, the visualization may be only of parts 106 actually present in aircraft 104 at a particular position in positions 114. In particular, graphical representations 214 of parts 106 are only for parts 106 that are present for current state 233 of assembly of object 102. In this manner, operators 122 may more easily visualize tasks 118 that may need to be performed with respect to parts 106 for object 102.

Further, this visualization for operators 122 with respect to parts 106 actually present in aircraft 104 may also be applied to the display of assembly 144 in volume 219. As described above, the display of assembly 144 in volume 219 is a display of graphical representations 214 for parts 106 that are present in assembly 144.

In FIG. 2, different components are illustrated as being located in object manager 124. These different components may be used as part of different systems. The systems may include at least one of object visualization system 134, shop order visualization system 135, and other suitable systems. A component in object manager 124 may be used in more than one system. For example, object visualizer 204 may be in both object visualization system 134 and shop order visualization system 135. In other words, the different components illustrated in object manager 124 may be used at the same time by different systems in object manager 124.

Figure 3:
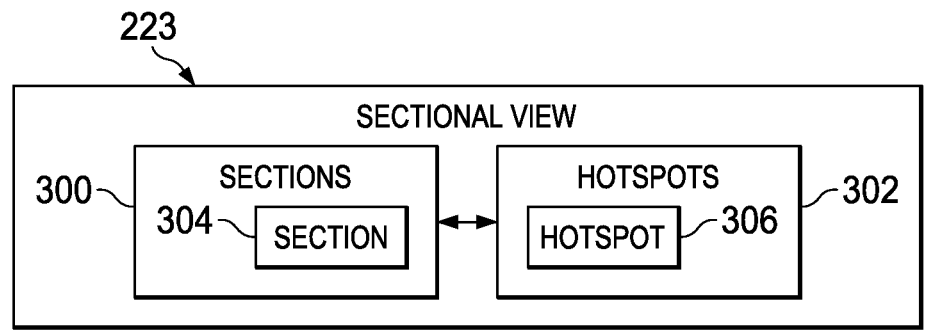
FIG. 3 is an illustration of a block diagram of a sectional view in accordance with an illustrative embodiment.

Turning now to FIG. 3, an illustration of a block diagram of a sectional view is depicted in accordance with an illustrative embodiment. An example of one implementation for sectional view 223 in FIG. 2 is shown.

As depicted, sectional view 223 includes a number of different pieces of information. For example, sectional view 223 includes sections 300 and hotspots 302.

Sections 300 are graphical representations corresponding to sections 136 for object 102 and, in particular, aircraft 104 in FIG. 1. In these illustrative examples, sections 300 may be located in a single image, multiple images, or some other suitable form. Graphical representations are in an exploded view in this illustrative example. Further, sections 300 are graphical representations corresponding to sections 136 manufactured for assembly of aircraft 104.

In these illustrative examples, sections 300 may be selectable. A selection of section 304 in sections 300 having hotspot 306 results in a volume corresponding to section 304 in model 216 being displayed in this illustrative example. Hotspot 306 may be a pointer to volume identifier 222 associated with volume 219. For example, hotspot 306 may include a universal resource locator, or some other suitable addressing convention to identify volume identifier 222 from volume identifiers 221 in volume database 220.

Figure 4:
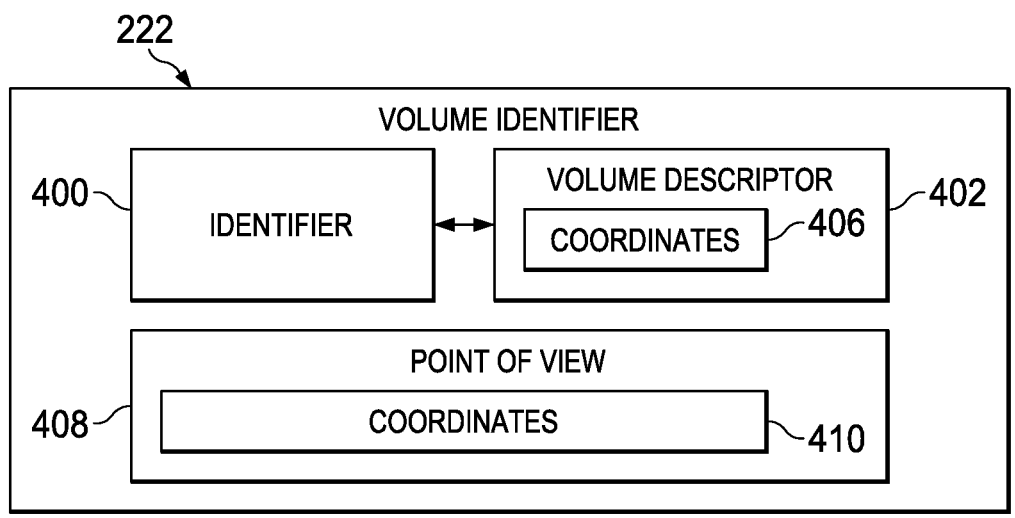
FIG. 4 is an illustration of a block diagram of a volume identifier in accordance with an illustrative embodiment.

Turning now to FIG. 4, an illustration of a block diagram of a volume identifier is depicted in accordance with an illustrative embodiment. In this illustrative example, one implementation for volume identifier 222 in FIG. 2 is shown.

Volume identifier 222 includes a number of components. As depicted, volume identifier 222 includes identifier 400 and volume descriptor 402.

Identifier 400 distinguishes volume identifier 222 from others of volume identifiers 221 that may be present in volume database 220. Identifier 400 may take various forms. For example, identifier 400 may be a word, a phrase, a number, an alphanumeric string, or some other suitable form.

Volume descriptor 402 describes the volume in model 216. For example, volume descriptor 402 may take the form of coordinates 406. Coordinates 406 are in the coordinate system used by model 216 in this example. For example, coordinates 406 may be three coordinates that may be used to define a polygon, a cube, or a cuboid. Of course, other information may be present in volume descriptor 402 other than coordinates 406. For example, volume descriptor 402 may include a single coordinate and a radius used to define volume 219 in a form of a sphere. In still other illustrative examples, a single coordinate may be present with preselected offsets that define volume 219 as a cube or some other shape.

The center of volume 219 may be the location of assembly 144 and shop order instance 250. The location may be the center of all of parts 106 in assembly 144 or may be based on a particular part in parts 106 in assembly 144.

In some illustrative examples, the volume identifier may also include point of view 408. Point of view 408 may define the view of the volume displayed to an operator when graphical representations 214 are displayed on a graphical user interface. For example, point of view 408 may include coordinates 410 of the point of view using the coordinate system for the volume.

With reference now to FIG. 5, an illustration of a block diagram of a shop order instance is depicted in accordance with an illustrative embodiment. As depicted, shop order instance 500 is an example of a shop order instance from shop order instances 132 in FIG. 1.

As depicted, shop order instance 500 may include a number of different parts. Shop order instance 500 includes identifier 502, classification 503, description 504, task 505, assigned operators 506, part identifier 508, location 510, instructions 512, and status 518.

As depicted, identifier 502 may be used to uniquely identify a task in tasks 118 in FIG. 1. Identifier 502 may be an alphanumeric identifier, a number, or some other suitable type of identifier.

In the illustrative example, classification 503 is used to classify the shop order instance. This classification may be based on the type of task to be performed. For example, the classifications may include seat installation, wiring, line replaceable unit installation, or other suitable types of classifications. The classification may be descriptive or may take the form of an identifier or other type of code.

Description 504 provides a description of task 505. This description may be a short description to provide the operator information about task 505. The description may be several words or a single sentence in some illustrative examples.

Task 505 identifies the work to be performed. For example, task 505 may be to install a part, assemble parts, perform an inspection, or some other suitable piece of work.

Assigned operators 506 identifies a group of operators that may be assigned to perform task 505. In some cases, an operator may not yet be assigned to perform task 505 for shop order instance 500.

In this illustrative example, part identifier 508 identifies a part assembled in object 102 using shop order instance 500. In this illustrative example, part identifier 508 is a part number for the part. For example, part identifier 508 may be a serial number, a combination of a serial number and vendor identifier, or some other suitable type of identification that uniquely identifies a particular part from other parts even if those parts are the same type.

In the illustrative examples, part identifier 508 may be used to generate the graphical representation of the parts identified. For example, part identifier 508 may be used to locate the information in a model needed to generate the graphical representation of the part for display.

Location 510 identifies the location where task 505 is to be performed. This location may be in coordinates for object 102 or some other coordinate system.

Instructions 512 are a group of instructions for performing task 505. In particular, the group of instructions may be for assembling a group of parts. These instructions may be step-by-step instructions, guidance, or other suitable types of instructions. These instructions may provide guidance for assembling parts, inspecting parts, or other suitable operations that may be performed for task 505. Instructions 512 also may include plans for the location in which task 505 is to be performed.

As depicted, status 518 provides information about the performance of task 505 for shop order instance 500. In this illustrative example, the status may indicate that work is to be performed, has been completed, is in progress, is unassigned, has been planned, is on hold, is ready, has been canceled, or some other suitable status for shop order instance 500. The status may be indicated using text, codes, symbols, or other suitable mechanisms. Additionally, if status 518 indicates that the work to be performed has been completed, status 518 also may include a date and time of when work for performing task 505 occurred.

Turning next to FIG. 6, an illustration of a block diagram of a state for a section of an aircraft is depicted in accordance with an illustrative embodiment. In this depicted example, state 600 is an example of the state in states 226.

In this illustrative example, state 600 is a data structure that stores information about parts that may be present for state 600. This data structure may be, for example, a flat file, a linked list, a record in a database, or some other suitable type of data structure.

State 600 may take the form of planned state 602, actual state 604, or both. In these illustrative examples, state 600 may be condition of assembly 606 for a particular position of aircraft 104 in positions 114 in FIG. 1. In particular, condition of assembly 606 may be a condition of assembly in conditions of assembly 227 in FIG. 2.

In this illustrative example, state 600 includes parts 608. Parts 608 are parts present in aircraft 104 for state 600 selected for aircraft 104. As depicted, parts 608 may be identified using part identifiers 610. Part identifiers 610 may take various forms. For example, part identifier 612 in part identifiers 610 may be a part number for part 614 in parts 608. For example, part identifier 612 may be a serial number, a combination of a serial number and vendor identifier, or some other suitable type of identification. In the illustrative examples, part identifier 612 may be any identifier that uniquely identifies a particular part from other parts even if those parts are the same type.

In this illustrative example, state 600 may be used by object visualizer 204 in object manager 124 to generate graphical representations 214 for parts 608 that may be present for state 600. In these illustrative examples, state 600 represents a particular position of aircraft 104 in positions 114. As a result, only parts 608 present for aircraft 104 are displayed in graphical representations 214 on graphical user interface 207.

This type of display may be especially useful when managing shop order instances 132. Operators 122 that may plan or perform other operations with respect to shop order instances 132 may more easily visualize status 137 for shop order instances 132 when parts 608 present for aircraft 104 are displayed in graphical representations 214 on graphical user interface 207.

With reference now to FIG. 7, an illustration of a block diagram of a dependency structure is depicted in accordance with an illustrative embodiment. As depicted, dependency structure 700 is an example of a dependency structure in dependency structures 213 in FIG. 2. In particular, dependency structure 700 is a data structure used to describe a dependency in dependencies 133 in FIG. 1. As depicted, dependency structure 700 includes rule 702, graphical indicator 704, and description 706.

Dependency structure 700 may be used to generate an indication of the presence of dependency structure 700 with respect to parts that may be installed using shop order instances. For example, dependency structure 700 may be displayed in conjunction with, or as part of, the status of the shop order instance on graphical user interface 207 in FIG. 2. For example, dependency structure 700 may be used to indicate that a particular shop order instance may not be performed before another one. In other words, the status of the shop order instance may be not ready. Dependency structure 700 may be used to indicate what the other shop order instance may need to be completed.

Rule 702 identifies at least one of a relationship between a number of parts, a relationship between a number of tasks, or a relationship between a number of parts and a number of tasks. For example, rule 702 may identify that a first part is dependent on a second part. The second part may be required to be available before the first part can be installed.

As another illustrative example, rule 702 may identify that a second task requires a first task to be performed before the second task can be performed. The first task may be, for example, inspecting a floor of an aircraft cabin. The second task may be to install a row of seats on the floor after the first task has been completed.

In yet another illustrative example, rule 702 may identify that a task requires a part to perform the task. For example, the task may be to inspect the part, thus, requiring access to the part. Additionally, rule 702 may also identify that a particular type of access is required for a particular task for a particular part. For example, the task may be to inspect the bottom of the part, thus, requiring access to the bottom of the part.

As depicted, graphical indicator 704 identifies an indicator for use when showing a dependency in graphical user interface 207. Graphical indicator 704 is selected to draw attention to the fact that a dependency is present for a particular shop order instance.

Description 706 in dependency structure 700 identifies information that may be displayed to an operator while showing the dependency in graphical user interface 207. In one illustrative example, description 706 may identify another shop order instance that may need to be performed. Description 706 may identify the shop order instance identifier, the part, or other information needed for an operator to understand what other work in another shop order instance may depend on the particular part or task for a current shop order instance.

In these illustrative examples, rule 702, graphical indicator 704, and description 706 may be selected by operators and by instructions in shop order instances. In other illustrative examples, these operators may be, for example, designers, engineers, managers, installers, or other operators that may provide input for the dependency identified by dependency structure 700.

Figure 8:
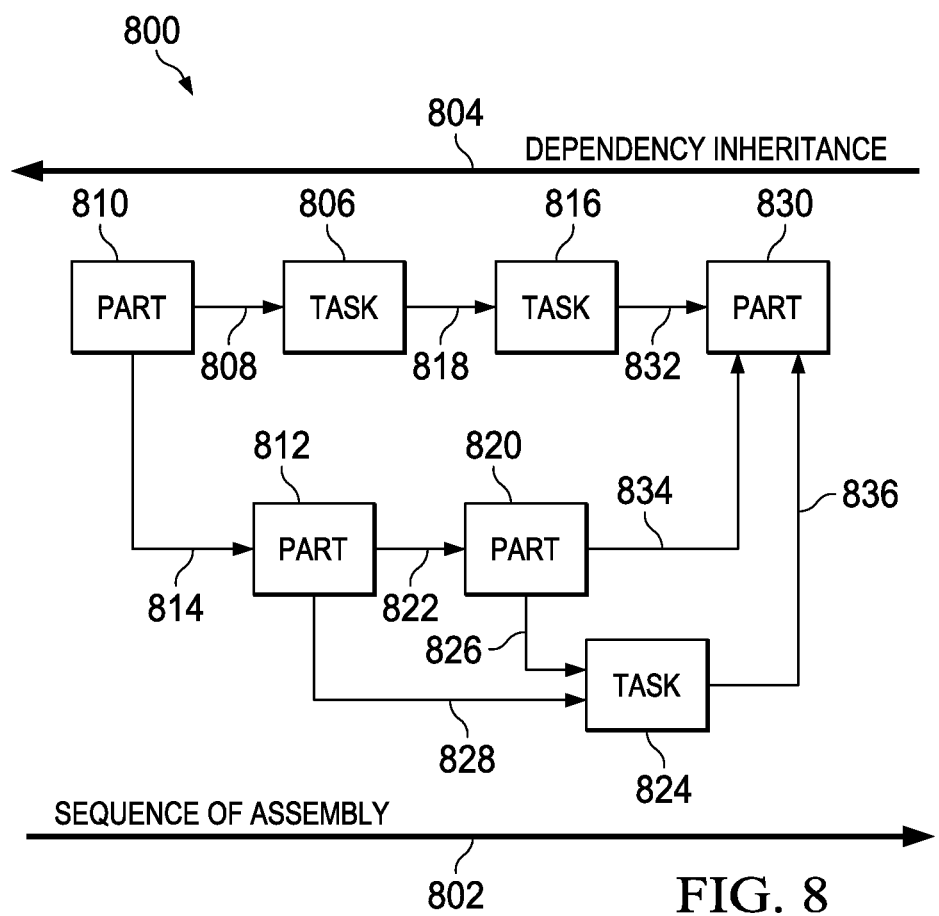
FIG. 8 is an illustration of a graph of dependencies in accordance with an illustrative embodiment.

Turning now to FIG. 8, an illustration of a graph of dependencies is depicted in accordance with an illustrative embodiment. In this illustrative example, the edges between tasks and parts in graph 800 are dependencies, such as dependencies 133 in FIG. 1. In this illustration, the sequence of assembly is shown as going in the direction of arrow 802 over a period of time. Dependency inheritance for tasks and parts are in the direction of arrow 804.

As depicted in graph 800, task 806 has dependency 808 for part 810; part 812 has dependency 814 for part 810; task 816 has dependency 818 for task 806; part 820 has dependency 822 for part 812; and task 824 has dependency 826 for part 820 and dependency 828 for part 812. Further, in this illustrative example, part 830 has dependency 832 for task 816, dependency 834 for part 820, and dependency 836 for task 824.

Part 810, part 812, part 820, and part 830 are examples of parts in parts 106 in FIG. 1. Task 806, task 816, and task 824 are examples of tasks in tasks 118 in FIG. 1. Dependency 808, dependency 814, dependency 818, dependency 822, dependency 826, dependency 828, dependency 832, dependency 834, and dependency 836 are examples of dependencies 133 in FIG. 1 that may be described using dependency structures 213 in FIG. 2.

In these illustrative examples, graph 800 is based on parts 106, tasks 118, and dependencies 133. Graph 800 may be created, modified, or created and modified by operators 122 in FIG. 1.

Graph 800 may be also modified by instructions in shop order instances 132 in FIG. 1. For example, an operator may add a number of parts, a number of tasks, and a number of dependencies to graph 800. An operator may also modify a number of parts, a number of tasks, and number of dependencies in graph 800. For example, an operator may remove a dependency in graph 800 that is no longer necessary for a performance of an assembly of an aircraft. As another example, an operator may add a new dependency that is necessary for a performance of an assembly of an aircraft. As still another example, instructions may be provided in shop order instances 132 in FIG. 1 to add and modify parts, tasks and dependencies in graph 800.

In other illustrative examples, the sequence of assembly and dependencies for tasks and parts may go in different and additional directions in graph 800. For example, other dependencies for task 806 may include a dependency for task 816 and a dependency for part 812.

The illustration of the different components that may be used in manufacturing environment 100 in FIGS. 1-8 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, although the illustrative examples are described with respect to an aircraft, an illustrative embodiment may be applied to other objects other than aircraft, such as, for example, without limitation, a vehicle, a submarine, a personnel carrier, a tank, a train, an automobile, a bus, a spacecraft, a surface ship, a spacecraft, a satellite, a rocket, an engine, a computer, harvesters, construction cranes, bulldozers, mining equipment, or other suitable types of objects.

In another illustrative example, a selection of section 304 with hotspot 306 may result in an inquiry being generated directly without using volume database 220. For example, hotspot 306 may include a query for the volume corresponding to section 304.

As another illustrative example, other information may also be present in dependency structure 700 in addition to rule 702, graphical indicator 704, and description 706. For example, dependency structure 700 may also include a universal resource locator.

For example, a universal resource locator (URL) in an instance of dependency structure 700 may be a pointer to a document describing the dependency. The universal resource locator may be presented as a link to additional information. For example, the link may be shown when information about the instance of dependency structure 700 is presented in a graphical user interface. With this feature, an operator selecting the link as displayed in a graphical user interface results in the document pointed to by the universal resource locator being retrieved. The retrieved document may then be displayed, for example, in a window in the graphical user interface.

With reference now to FIGS. 9-15, illustrations of the display of graphical user interfaces for identifying the status of shop order instances are depicted in accordance with an illustrative embodiment. These figures illustrate one manner in which graphical user interface 207 in FIG. 2 may be implemented. The different graphical user interfaces may be displayed on a display system, such as display system 208 in FIG. 2, and an operator may interact with the graphical user interfaces using an input system, such as input system 210 in FIG. 2.

Figure 9:
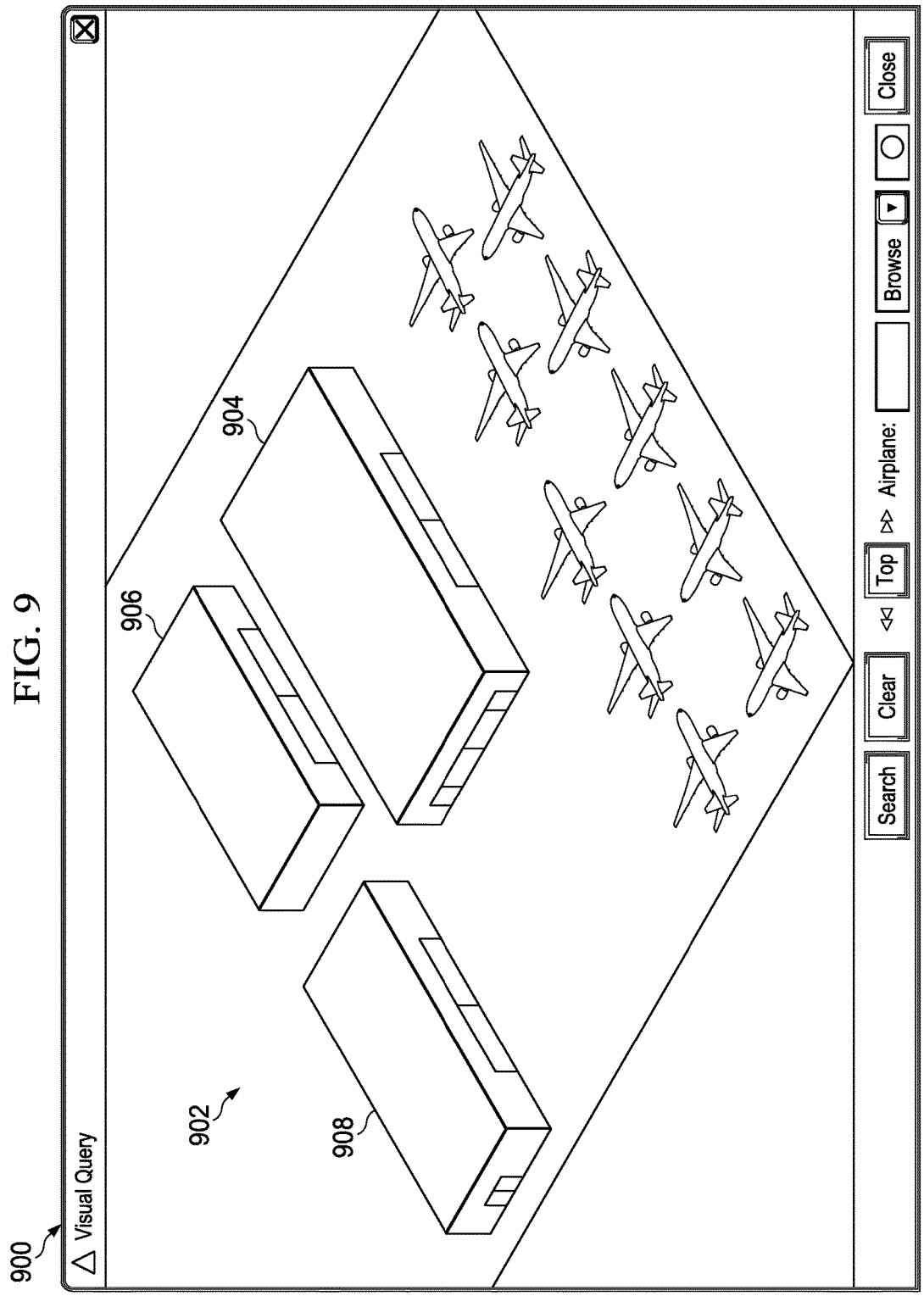
FIG. 9 is an illustration of a graphical user interface for viewing statuses of shop order instances in accordance with an illustrative embodiment.

With reference to FIG. 9, an illustration of a graphical user interface for viewing statuses of shop order instances is depicted in accordance with an illustrative embodiment. In this illustrative example, graphical user interface 900 displays buildings 902 including building 904, building 906, and building 908.

In this particular example, each building in buildings 902 in graphical user interface 900 represents a location where manufacturing of aircraft occurs. Each building may correspond to a database of aircraft that are manufactured within the building.

Figure 10:
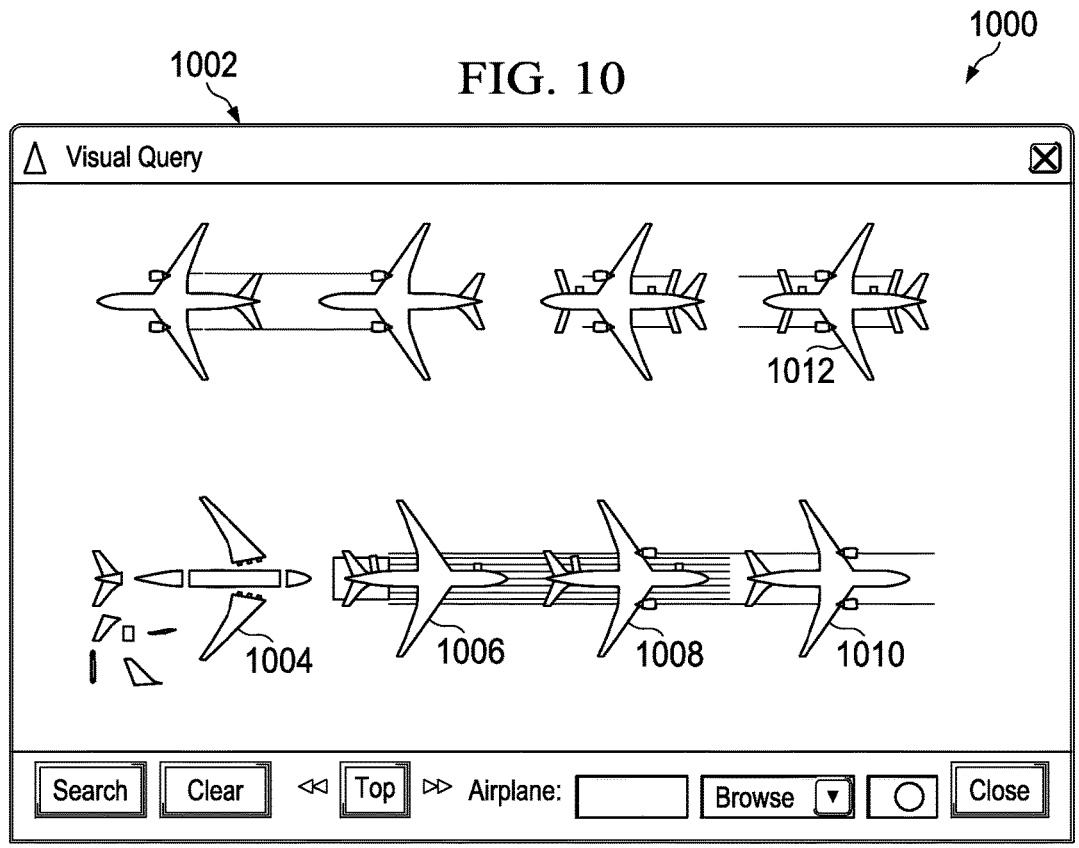
FIG. 10 is an illustration of aircraft positions in a building in accordance with an illustrative embodiment.

Turning now to FIG. 10, an illustration of aircraft positions in a building is depicted in accordance with an illustrative embodiment. In this illustrative example, aircraft positions 1000 are displayed in graphical user interface 1002. These positions correspond to tasks that may be performed at different stages of the assembly of an aircraft.

In this particular example, aircraft positions 1000 include position 1004, position 1006, position 1008, position 1010, and position 1012. In these illustrative examples, certain tasks are performed in different positions in aircraft positions 1000. In other words, the aircraft assembly progresses from position to position with different parts being added to the aircraft at the different positions in aircraft positions 1000.

A selection of one of these positions results in identifying graphical representations for parts that would be installed at a particular position as well as any parts that may have been installed from a prior position. As a result, parts that are not to be installed into a subsequent position are not present. For example, an aircraft in position 1012 is a fully configured aircraft. An aircraft in position 1010 may not have seats and carpet. An aircraft in position 1008 may not include stove ends, lavatories, galleys, and other parts. These different positions in aircraft positions 1000 may have different conditions of assembly for the aircraft in these illustrative examples.

In these illustrative examples, each of these positions may have models associated with the position. These models may contain the parts that are present in the aircraft for a particular position. As a result, a selection of a position results in a selection of models that may be used to display graphical representations of parts. As a result, models for positions with fewer parts may be queried more quickly to identify information to generate graphical representations of parts for the aircraft.

Additionally, in these illustrative examples, shop order instances in a shop order database may be identified for each of the positions. In other words, each position may have a shop order database containing shop order instances that may be generated for those particular positions. As a result, positions with fewer parts have fewer shop order instances to monitor or manage. In this manner, faster query of a shop order database for a particular position may be made when that database is for a position with fewer parts. After the selection of the position, an operator may select a section of aircraft for review.

Figure 11:
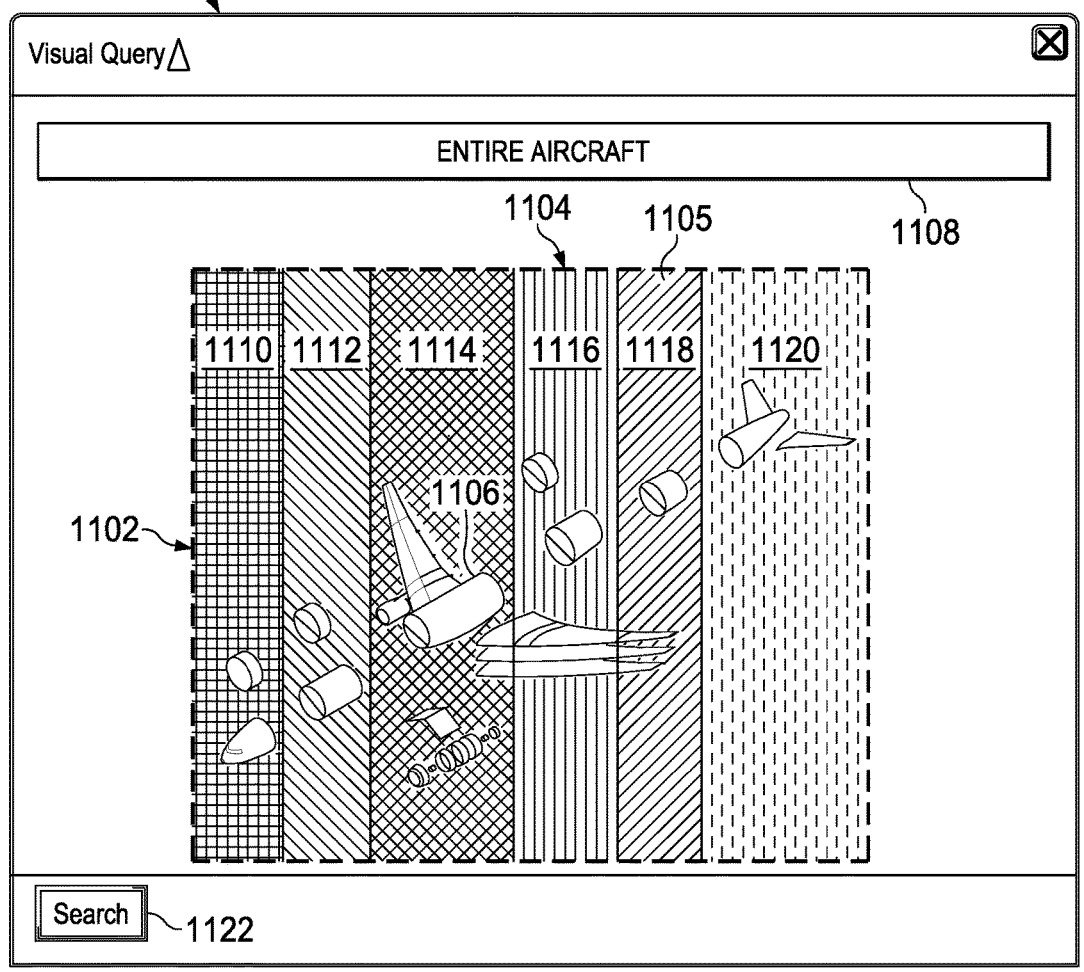
FIG. 11 is an illustration of a graphical user interface of aircraft sections in accordance with an illustrative embodiment.

Turning now to FIG. 11, an illustration of a graphical user interface of aircraft sections is depicted in accordance with an illustrative embodiment. In this illustrative example, graphical user interface 1100 displays sections 1102 for an aircraft in area 1104 of graphical user interface 1100. In this illustrative example, sections 1102 are for position 1012 of the aircraft in FIG. 10.

As depicted, sectional view 1105 is displayed in area 1104 of graphical user interface 1100. Sectional view 1105 is an example of one implementation for sectional view 223 shown in block form in FIG. 2 and FIG. 5. In this particular example, sectional view 1105 may be for an aircraft in position 1012 in FIG. 10.

An operator may select a section from sections 1102. As depicted, sections 1102 are examples of sections 300 in FIG. 3 as displayed in graphical user interface 1100. Sections 1102 are selectable in this particular example. In other words, sections 1102 may include hotspots. These hotspots are not seen in this illustrative example. Hotspots are areas in graphical user interface 1100 that may be selected to cause an action. In these illustrative examples, these hotspots correspond to sections 1102. The hotspots may encompass sections 1102 or may be around sections 1102 or some combination thereof.

As another example, section 1106 is an example of a section in sections 1102 that may be selected. A selection of this section results in a more detailed illustration of section 1106 being displayed. In this example, section 1106 is an upper barrel portion of an aircraft.

Additionally, an identification of the parts present in the section is also made in response to the user selection of a particular section. This identification may include any parts that are present for the particular position of the aircraft in that section. In other words, the same section of an aircraft in different positions may have different parts that are present based on tasks for installing parts. This identification may be made through the use of states 226 in FIG. 2.

In the illustrative example, an operator may select to view the entire aircraft by selecting entire aircraft in area 1108 in graphical user interface 1100. In other words, the volume for display may be the entire aircraft. Further, an operator may select groups of sections 1102. As depicted, the selection may be made by selecting one of area 1110, area 1112, area 1114, area 1116, area 1118, and area 1120 in graphical user interface 1100. In these illustrative examples, these areas have hotspots. In this manner, an operator may view different portions of an aircraft in a manner that suits the particular query that the operator desires.

In this illustrative example, other types of queries may be made through graphical user interface 1100. For example, search button 1122 may be used to initiate a search for a particular shop order instance. This search may be performed to provide visualizations of an assembly associated with the particular shop order instance.

Figure 12:
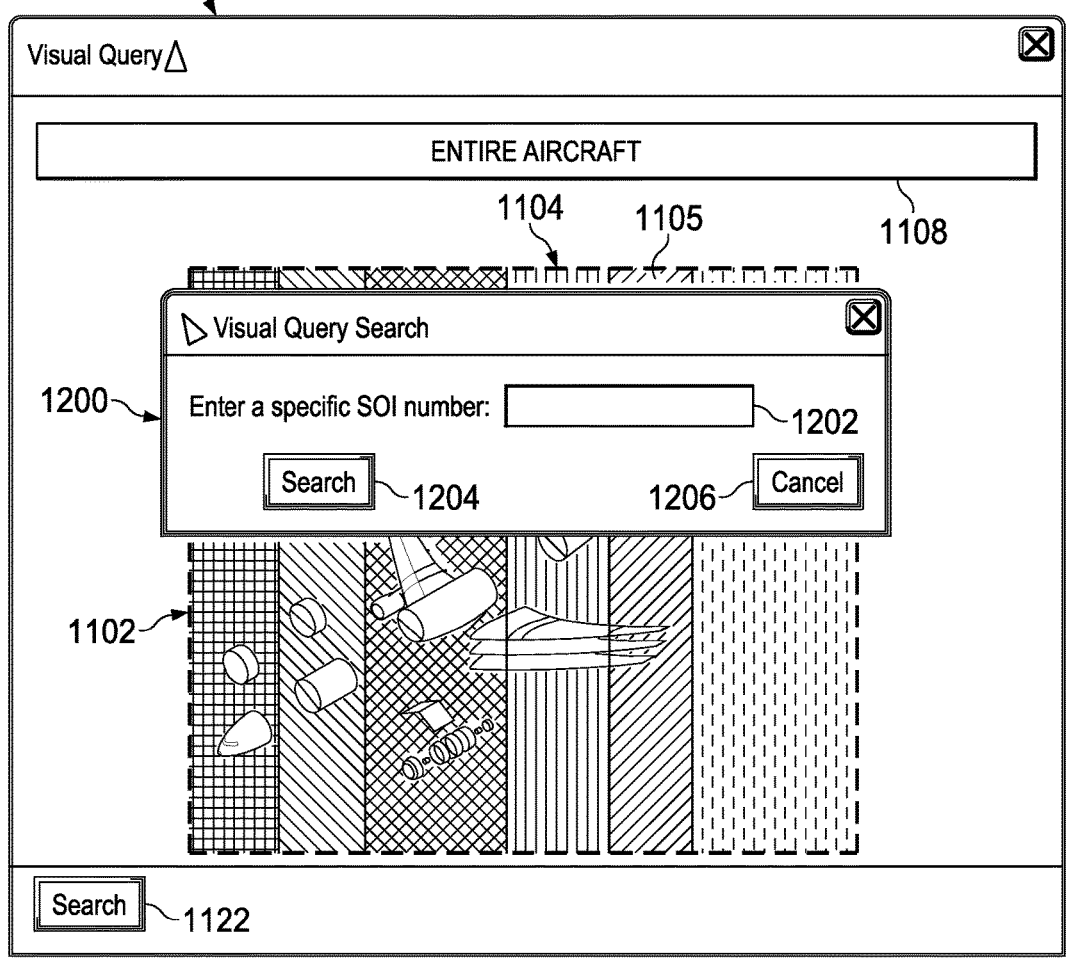
FIG. 12 is an illustration of a graphical user interface for querying a shop order instance in accordance with an illustrative embodiment.

With reference now to FIG. 12, an illustration of a graphical user interface for querying a shop order instance is depicted in accordance with an illustrative embodiment. In this depicted example, the selection of search button 1122 results in window 1200 being displayed in graphical user interface 1100.

Window 1200 may be used to perform a visual search in this illustrative example. As depicted, a shop order instance identifier may be entered into field 1202 in window 1200. Pressing search button 1204 results in initiating a search for the shop order instance identifier that is entered. Selection of cancel button 1206 cancels the search in this illustrative example.

The illustration of graphical user interface 900 with buildings 902 in FIG. 9, graphical user interface 1002 with aircraft positions 1000 in FIG. 10, graphical user interface 1100 in FIG. 11 and FIG. 12 are examples of multilevel querying that may be performed in accordance with an illustrative embodiment. As depicted, the selection of a building from buildings 902 may select a particular model for an aircraft. The particular model may be displayed with positions using graphical user interface 1002. The selection of a position may result in another view being displayed with sections 1102 in graphical user interface 1100. In this manner, an operator may more easily traverse models of different aircraft, depending on the position selected.

In addition to the multilevel querying, graphical user interface 1100 in FIG. 11 also provides an interface to visualize an assembly for a shop order instance. As described above, window 1200 is configured to receive the identification of a shop order instance. With this identification, a visualization of an assembly for the shop order instance may be displayed as described below.

Figure 13:
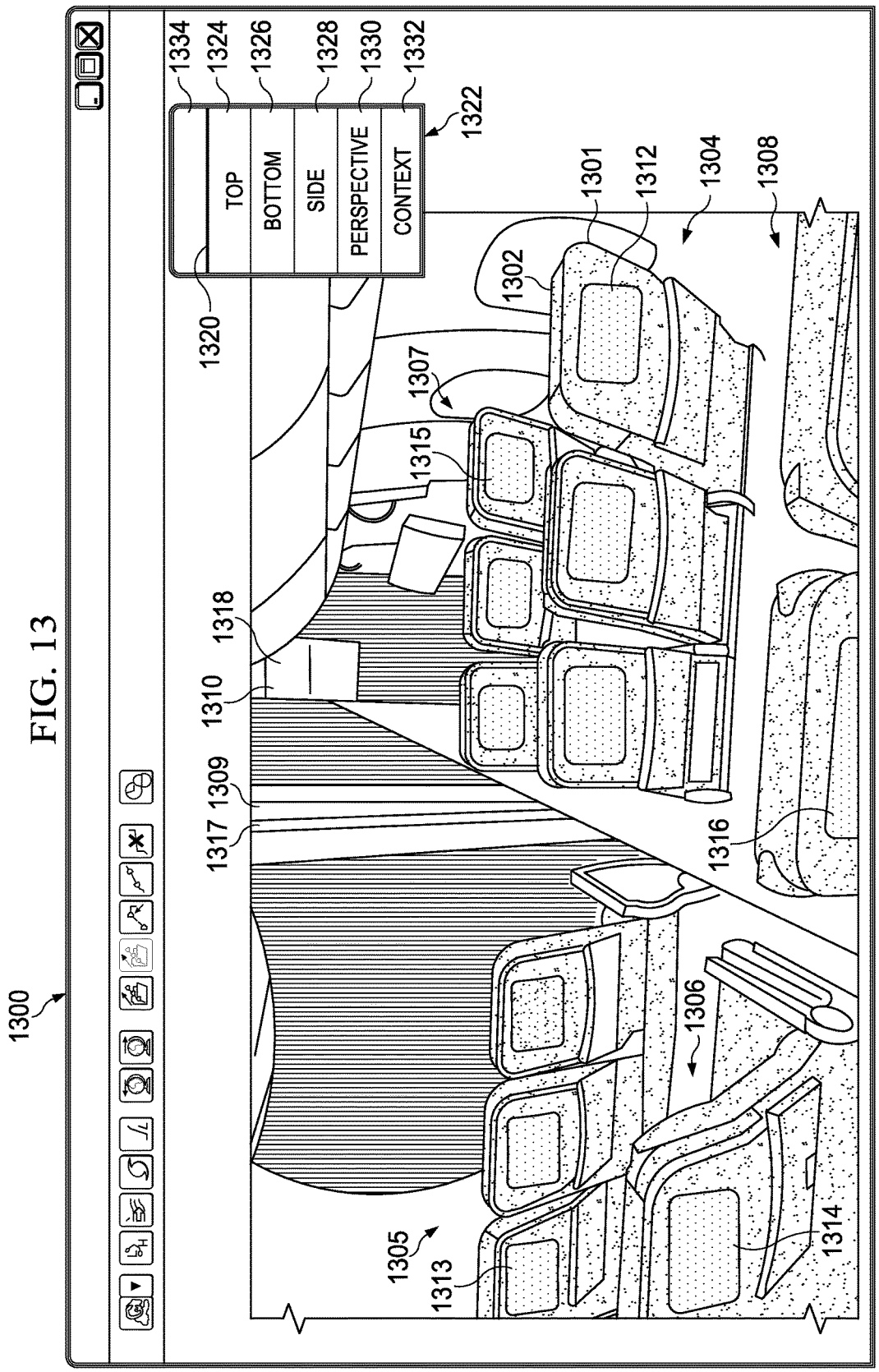
FIG. 13 is an illustration of a graphical user interface with a visual representation from the shop order instance in accordance with an illustrative embodiment.

In FIG. 13, an illustration of a graphical user interface with a visual representation from the shop order instance is depicted in accordance with an illustrative embodiment. In this depicted example, graphical user interface 1300 displays a view of a volume. This volume includes a graphical representation of parts 1301 in assembly 1302. In this illustrative example, assembly 1302 takes the form of row of seats 1304.

Further, other assemblies are displayed in the volume in graphical user interface 1300. For example, row of seats 1305, row of seats 1306, row of seats 1307, row of seats 1308, storage closet 1309, and lavatory 1310 in this particular volume are displayed for assembly 1302 in graphical user interface 1300.

In addition, graphical indicator 1312 may be displayed in association with assembly 1302 to indicate the status of this shop order instance. In this illustrative example, graphical indicator 1313 is displayed in association with row of seats 1305, graphical indicator 1314 is displayed in association with row of seats 1306, graphical indicator 1315 is displayed in association with row of seats 1307, graphical indicator 1316 is displayed in association with row of seats 1308, graphical indicator 1317 is displayed in association with storage closet 1309, and graphical indicator 1318 is displayed in association with lavatory 1310. These graphical indicators also may indicate a status of shop order instances for the assembly displayed to provide a visual context for assembly 1302.

In this manner, an operator viewing the shop order instance for assembly 1302 may see the assembly of parts 1301 visually in context with other assemblies as shown visually in graphical user interface 1300. This visual context may provide a visualization for instructions in the shop order instance for assembling assembly 1302.

Further, when graphical indicators are provided that indicate the status of shop order instances, an operator may gain additional information about the context of the particular assembly of interest in a shop order instance with respect to other assemblies.

In this particular example, the assemblies displayed in graphical user interface 1300 are assemblies present for a particular state in states 226. For example, the state may be for a particular state at a selected position in positions 114 where the task for a shop order instance is to be performed. In another example, assemblies displayed may be for some other state that has already occurred or one that is planned for the aircraft.

Additionally, in graphical user interface 1300, an operator is able to traverse different parts of the volume displayed to view and examine assembly 1302 as well as other assemblies in the volume displayed.

For example, an operator may select a graphical representation in the graphical representations for assembly 1302. The selection of the graphical representation for assembly 1302 may provide a closer view of assembly 1302.

In another illustrative example, the graphical representations of the different assemblies in the volume displayed in graphical user interface 1300 may be traversed using commands 1320 displayed in menu 1322. In this illustrative example, commands 1320 include top 1324, bottom 1326, side 1328, perspective 1330, and context 1332.

In this illustrative example, context 1332 may allow for the display of assembly 1302 to be in the context of other assemblies or without the context of other assemblies. In other words, only assembly 1302 may be displayed without the other parts present.

Of course, these commands for different views are only examples and not meant to encompass all the different types of commands that may be used to view graphical representations of particular parts. For example, commands such as zoom, pan, and other suitable commands also may be present in addition to or in place of the ones depicted in this illustrative example.

Additionally, in some cases, a part identifier may be entered into part field 1334. By entering a part identifier, different views of a particular part may be seen by the operator. Additionally, the operator may also select a command for commands 1320 to provide a particular view of the part.

Of course, other processes may be used to traverse and view graphical representations of parts 1301 in assembly 1302 as well as parts for other assemblies. These types of processes may include those typically used with computer-aided design software and other types of software in which graphical representations of parts may be viewed and traversed.

Figure 14:
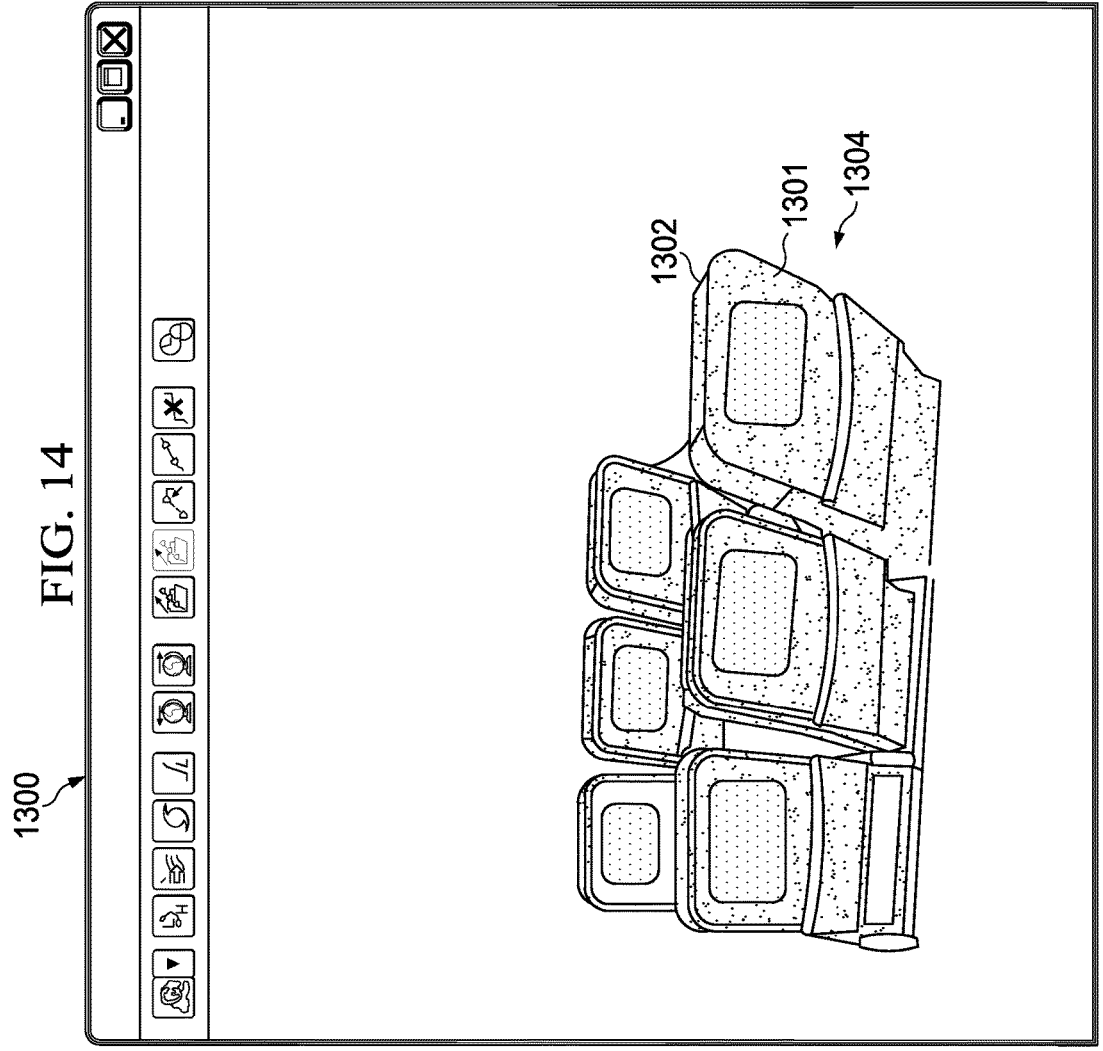
FIG. 14 is an illustration of a display of shop order instance information in accordance with an illustrative embodiment.

Turning next to FIG. 14, an illustration of a display of shop order instance information is depicted in accordance with an illustrative embodiment. As depicted, graphical user interface 1300 only displays graphical representations of parts 1301 for assembly 1302. The graphical representations for other assemblies are not shown in this view. In this manner, an operator may visualize parts 1301 for assembly 1302 alone without other assemblies potentially obscuring the examination of assembly 1302.

Figure 15:
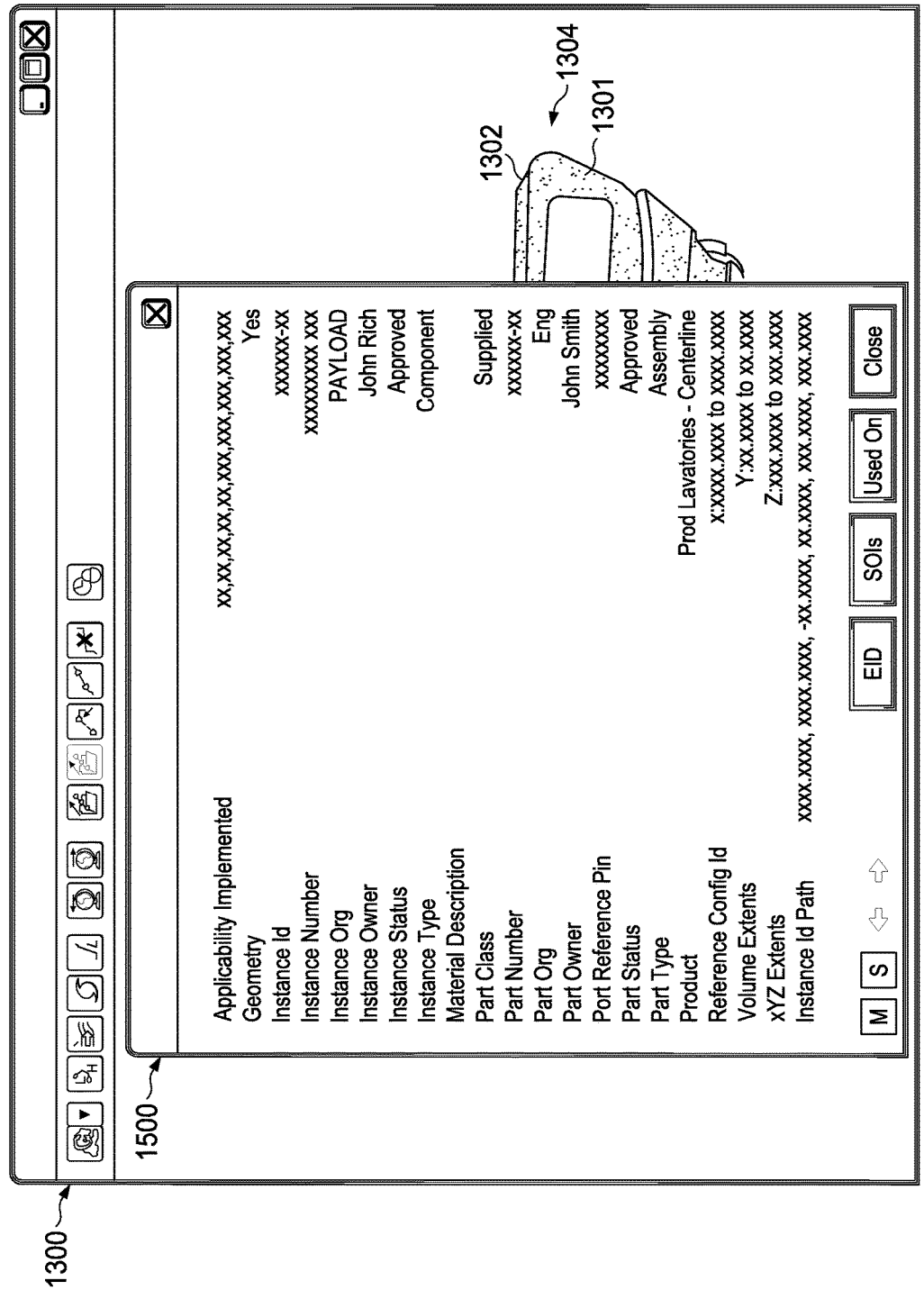
FIG. 15 is another illustration of a display of shop order instance information in accordance with an illustrative embodiment.

With reference next to FIG. 15, another illustration of a display of shop order instance information is depicted in accordance with an illustrative embodiment. In this illustrative example, window 1500 is displayed within graphical user interface 1300 when the graphical representation of assembly 1302 is selected. Window 1500 displays information about the shop order instance for assembly 1302. This information may be obtained from shop order instance 500 as illustrated in FIG. 5 as well as other sources depending on the particular implementation.

The illustrations of the different graphical user interfaces in FIGS. 9-15 are provided only as examples of some implementations for graphical user interface 207 in FIG. 2. These examples are not meant to limit the manner in which an illustrative embodiment may be implemented. For example, although the different examples are displayed with reference to aircraft, similar displays may be used for other types of vehicles or objects. For example, the graphical user interfaces may be configured for sections of objects such as an automobile, a ship, a satellite, an engine, or some other suitable type of object.

As another illustrative example, the display of the different graphical user interfaces may be performed using other graphical user interfaces in addition to or in place of the ones depicted. Further, the order of the graphical user interfaces may vary from the order described above.

As another illustrative example, the display of the different graphical user interfaces may be performed using other graphical user interfaces in addition to or in place of the ones depicted. Further, the order of the graphical user interfaces may vary from the order described above.

In one illustrative example, the identification of the shop order instance may be performed with window 1200 as the graphical user interface instead of graphical user interface 1100 as depicted in the illustrative example. Of course, window 1200 may be displayed with other graphical user interfaces in addition to or in place of graphical user interface 1100.

Figure 16:
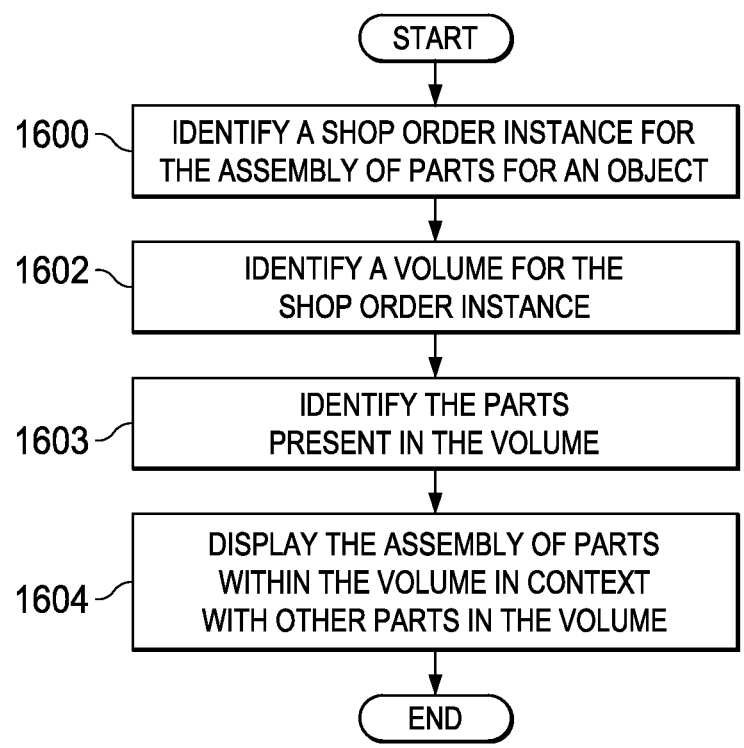
FIG. 16 is an illustration of a flowchart of a process for visualizing an assembly of parts in accordance with an illustrative embodiment.

With reference next to FIG. 16, an illustration of a flowchart of a process for visualizing an assembly of parts is depicted in accordance with an illustrative embodiment. The process illustrated in FIG. 16 may be implemented in manufacturing environment 100 in FIG. 1. In particular, one or more of the different operations illustrated may be implemented using object manager 124 in FIG. 1.

The process begins by identifying a shop order instance for the assembly of parts for an object (operation 1600). The identification of the shop order instance may be received in a number of different ways. For example, the identification may be received through user input by an operator to a graphical user interface. One example of how this input may be received is through the use of window 1200 in graphical user interface 1100 in FIG. 12. Of course, this identification of the shop order instance may be made other ways. For example, a list of shop order instances may be displayed and user input may select one of the shop order instances. These other mechanisms for identifying a particular shop order instance may be employed in accordance with an illustrative embodiment.

The process then identifies a volume for the shop order instance (operation 1602). Next, the process identifies the parts present in the volume (operation 1603). These parts include parts for the assembly. These parts also may include parts for other assemblies that are in the volume. The process displays the assembly of parts within the volume in context with other parts in the volume (operation 1604), with the process terminating thereafter.

Figure 17:
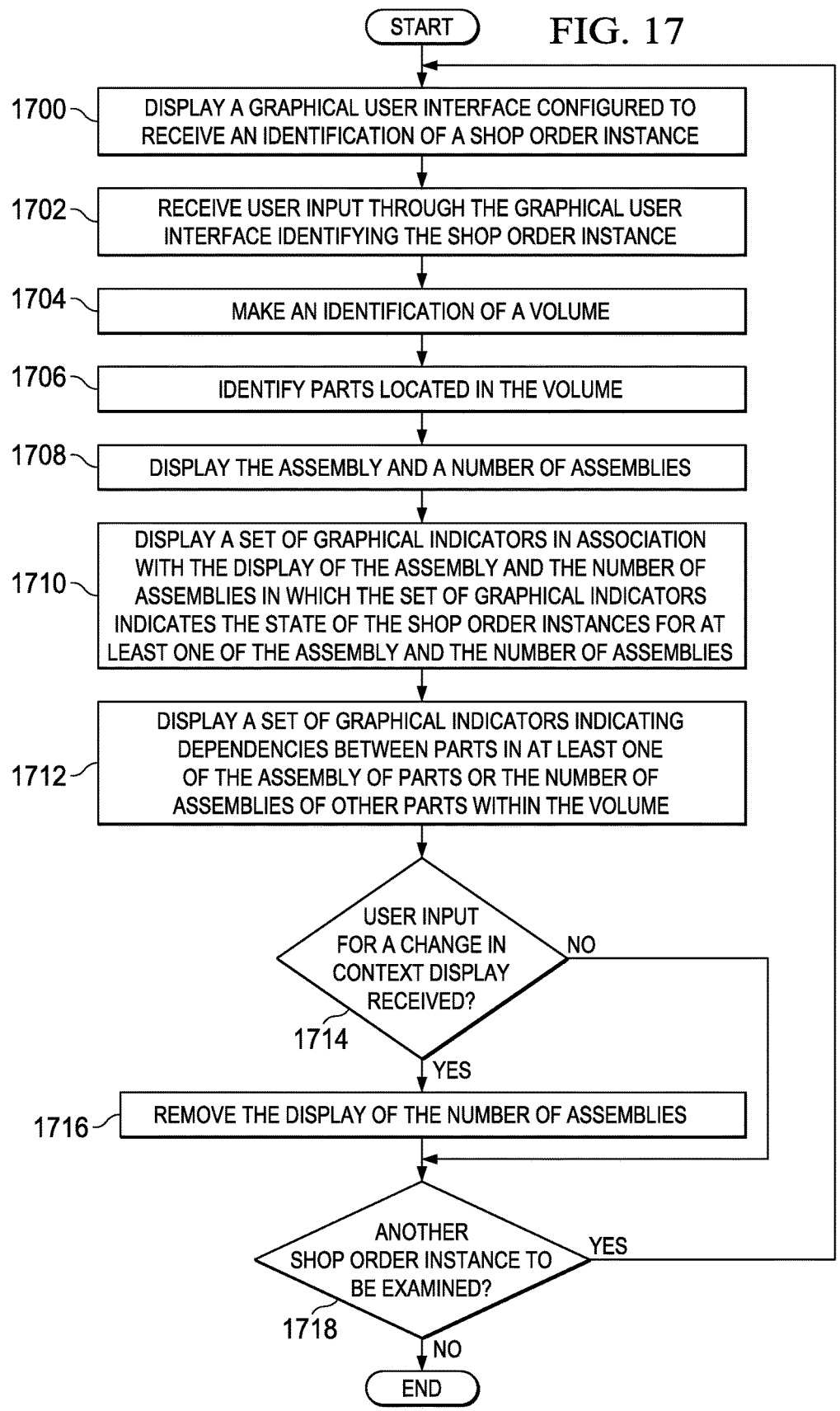
FIG. 17 is an illustration of a more detailed flowchart for visually displaying an assembly in accordance with an illustrative embodiment.

With reference next to FIG. 17, an illustration of a more detailed flowchart for visually displaying an assembly is depicted in accordance with an illustrative embodiment. The process illustrated in FIG. 17 may be implemented in manufacturing environment 100 in FIG. 1. In particular, one or more of the different operations illustrated may be implemented using object manager 124 in FIG. 1.

The process begins by displaying a graphical user interface configured to receive an identification of a shop order instance (operation 1700). The process receives user input through the graphical user interface identifying the shop order instance (operation 1702).

Next, an identification of a volume is made (operation 1704). The volume may be identified in a number of different ways. In one illustrative example, the volume is based on at least one of a section in which the assembly is located, a selected distance from the assembly, or based on some other rule or selection process.

For example, the volume may be identified from a volume database that identifies volumes for assemblies. This database may be, for example, volume database 220 in FIG. 2. In other illustrative examples, the volume may be a volume based on a section in which the assembly is located. In still other illustrative examples, the volume may be identified based on some selected distance from the location of the assembly in the shop order instance. In this case, the volume may not be located in a database when the shop order instance containing the assembly is identified.

Parts located in the volume are identified (operation 1706). These parts are for the assembly that is present in the volume. The assembly includes assembly for the shop order instance and other assemblies that may be located in the volume with the assembly for the shop order instance. These parts may be parts present in the volume for a current state of assembly, for example, when the aircraft is on an assembly line. Of course, parts may be for some other state depending on the particular implementation.

The process then displays the assembly and a number of assemblies (operation 1708). The display of the assembly and the number of assemblies is performed by displaying graphical representations of the assemblies in the graphical user interface. This display provides a visual context of other assemblies relative to the assembly in the shop order instance.

Next, a set of graphical indicators are displayed in association with the display of the assembly and the number of assemblies in which the set of graphical indicators indicates the state of the shop order instances for at least one of the assembly and the number of assemblies (operation 1710). These graphical indicators may be associated with the assembly, parts in the assembly, or some combination thereof.

The process also displays a set of graphical indicators indicating dependencies between parts in at least one of the assembly of parts or the number of assemblies of other parts within the volume (operation 1712).

A determination is then made as to whether the user input for a change in context display has been received (operation 1714). This change in context display may be performed to the selection of a command such as context 1332 in menu 1322 in FIG. 13.

If user input for a change in context has been received, the process removes the display of the number of assemblies (operation 1716). In this manner, the operator may view only the assembly for the shop order instance. Further, the operator may then traverse this view to obtain more information if desired.

The process then determines whether another shop order instance is to be examined (operation 1718). The process also proceeds to operation 1718 if user input has not been received for a change in the context. If another shop order instance is to be examined, the process returns to operation 1700. Otherwise, the process terminates.

Figure 18:
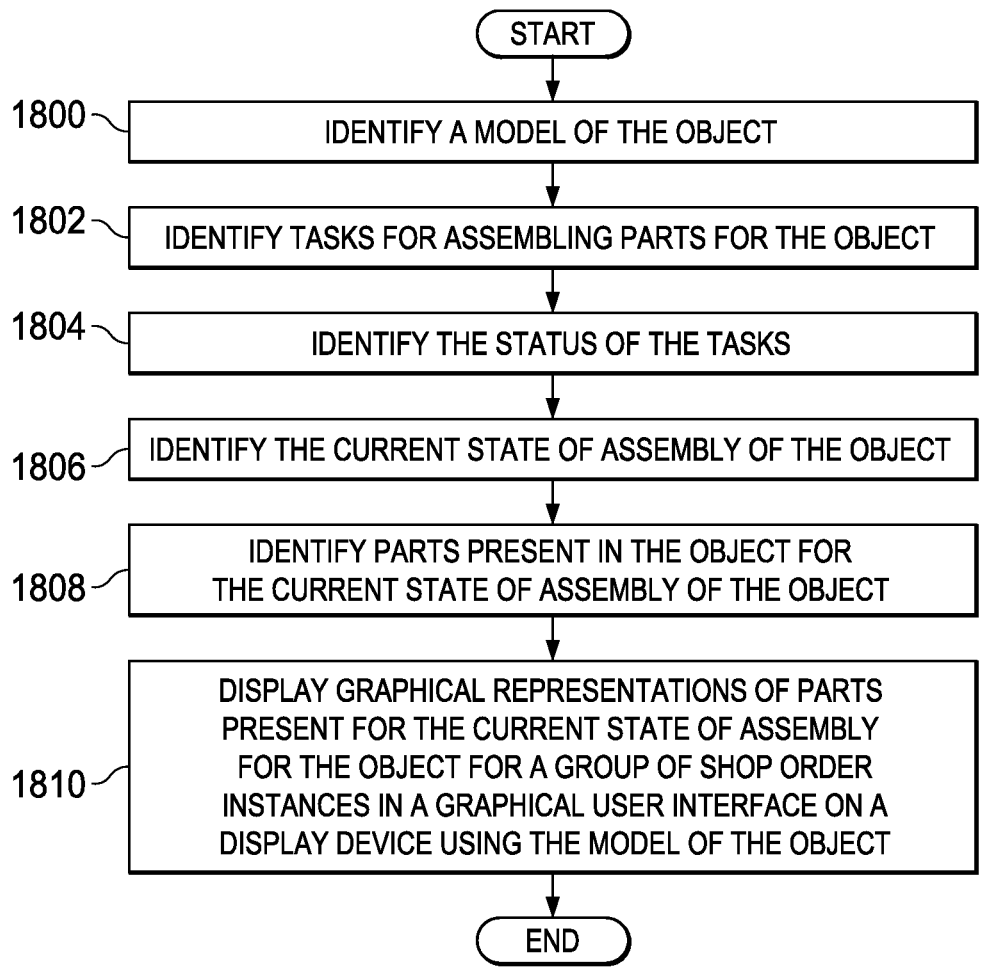
FIG. 18 is an illustration of a flowchart of a process for identifying the status of tasks in accordance with an illustrative embodiment.

With reference now to FIG. 18, an illustration of a flowchart of a process for identifying the status of tasks is depicted in accordance with an illustrative embodiment. The process illustrated in FIG. 18 may be implemented in manufacturing environment 100 in FIG. 1. In particular, one or more of the different operations illustrated may be implemented using object manager 124 in FIG. 1.

The process begins by identifying a model of the object (operation 1800). The process then identifies tasks for assembling parts for the object (operation 1802). The process identifies the status of the tasks (operation 1804).

Next, the process identifies the current state of assembly of the object (operation 1806). The process then identifies parts present in the object for the current state of assembly of the object (operation 1808). The process then displays graphical representations of parts present for the current state of assembly for the object for a group of shop order instances in a graphical user interface on a display device using the model of the object (operation 1810), with the process terminating thereafter. The set of graphical indicators indicates a status of a portion of the tasks for the parts displayed using the graphical representations. In addition, in this illustrative example, only parts present for the current state of assembly of the object are displayed. In other words, only parts that are present are shown and graphical indicators may be displayed in association with those parts to indicate a status of tasks performed such as those in shop order instances.

Figure 19:
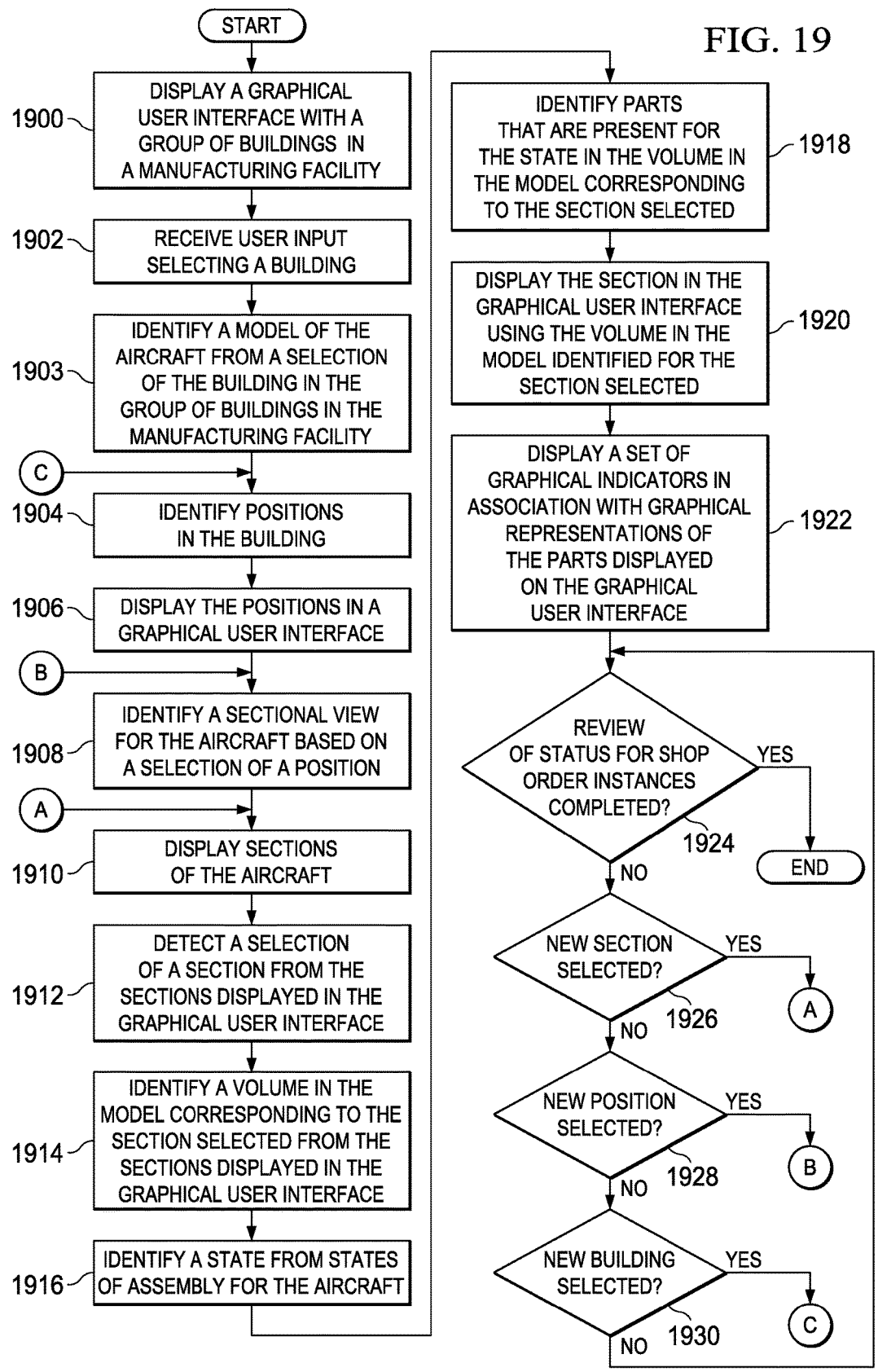
FIG. 19 is an illustration of a flowchart of a process for identifying the status of shop order instances in accordance with an illustrative embodiment.

Turning now to FIG. 19, an illustration of a flowchart of a process for identifying the status of shop order instances is depicted in accordance with an illustrative embodiment. This process is an example of one manner in which the assignment of tasks through shop order instances may be managed. In particular, dedication of a status of different tasks in shop order instances may be identified in accordance with an illustrative embodiment. The different operations illustrated in FIG. 19 may be implemented using status identifier 206 in FIG. 2.

The process begins by displaying a graphical user interface with a group of buildings in a manufacturing facility (operation 1900). The graphical user interface includes hotspots for the buildings that can be selected. A hotspot is a portion of the graphical user interface that may be selected to cause an action. In these illustrative examples, the buildings are hotspots that may be selected by an operator.

The process then receives user input selecting a building (operation 1902). In the illustrative example, each building may be used to assemble a particular aircraft. The particular aircraft may be a particular type of aircraft such as the model. In some cases, more than one building may be used to assemble the same type of aircraft but the particular aircraft may be a specific build for a customer with specific options. In other words, different aircraft of the same type may be assembled in different buildings that have different options although they are of the same type.

Next, a model of the aircraft is identified from a selection of the building in the group of buildings in the manufacturing facility (operation 1903). Positions in the building are identified (operation 1904). Each building may have different positions for the aircraft that are being assembled. Further, even if a building has the same positions, the status of an aircraft at a particular building at particular positions may be different from other buildings. Further, even with the same positions, different aircraft may be assembled in the positions in different buildings.

The positions are displayed in a graphical user interface (operation 1906). In these illustrative examples, the different positions are hotspots that may be selected through user input entered by an operator. The process then receives user input for selecting a position.

The process then identifies a sectional view for the aircraft based on a selection of a position (operation 1908). In the illustrative example, each position may have a different sectional view that may be displayed. The sections of an aircraft in a position are the sections manufactured at the position selected in these illustrative examples. The sectional view includes sections for that particular position.

As depicted, the sectional view may be, for example, sectional view 223 in sectional views 224 as shown in FIG. 2. Different sectional views are present for different positions in this illustrative example. Sectional view 1105 in FIG. 11 is an example of a sectional view that may be selected depending on the position selected for the aircraft in operation 1908.

In these illustrative examples, the sectional views were selected for parts that are present in the aircraft for the position. These are parts that may already be present from assembly of the aircraft in a prior position or may be parts that are to be assembled in the position selected.

The process then displays sections of the aircraft (operation 1910). In operation 1910, the sections are displayed in the sectional view of the aircraft. Further, the different sections are displayed in association with hotspots that may be selected by user input entered by an operator. The process then detects a selection of a section from the sections displayed in the graphical user interface (operation 1912). In operation 1912, the section has hotspots associated with the volume identifier. The selection of a section of an aircraft involves selecting the hotspot associated with the aircraft. The hotspot points to a volume identifier, such as volume identifier 222 in FIG. 2. In some cases, the hotspot may be a link pointing to the volume identifier. For example, the hotspot may be an index used to identify a volume identifier.

The process then identifies a volume in the model corresponding to the section selected from the sections displayed in the graphical user interface (operation 1914). In these illustrative examples, each section of an aircraft is associated with the volume for the aircraft. This volume is identified from volume identifiers associated with sections in the sectional view using the volume identifier pointed to by the hotspot selected for the section. The volume identifier may include information defining the volume. For example, volume identifier 222 may include volume descriptor 402 as depicted in FIG. 4. In particular, the identifier may include a group of coordinates defining the volume in the model.

Next, the process identifies a state from states of assembly for the aircraft (operation 1916). In these illustrative examples, the state of assembly may be a condition of assembly based on the position of the aircraft within a manufacturing facility. The process then identifies parts that are present for the state in the volume in the model corresponding to the section selected (operation 1918). These parts that are present are ones that are present for a particular state for the aircraft. In this illustrative example, the parts may be those present for a current state of assembly of the aircraft. With the parts for the current state of assembly, visualizing information about shop order instances may be easier.

The process then displays the section in the graphical user interface using the volume in the model identified for the section selected (operation 1920). In these illustrative examples, the parts are displayed as graphical representations rather than a list of parts. In this illustrative example, the graphical representations are for parts that are present for the state selected from the state of assembly. In particular, the state of assembly may be the current state of assembly for the object at its current position on the assembly line. Of course, in other illustrative examples, other states, past or present, may be used to perform an analysis of shop order instances that have been performed or may be performed. Further, the display of the parts in the display may be manipulated by the operator to view the parts of different perspectives and different identifications.

The process then displays a set of graphical indicators in association with graphical representations of the parts displayed on the graphical user interface (operation 1922). In this illustrative example, the graphical indicators take the form of colors used to display the graphical representations of the parts. For example, the colors may comprise at least one of red indicating that work for a part on a shop order instance is available, green indicating that the work for the part on the shop order instance is completed, yellow indicating that the work for the part on the shop order instance is in progress, and grey indicating that the work for the part is unassigned to the shop order instance.

A determination is made as to whether the review of status for shop order instances has been completed (operation 1924). If the review has been completed, the process terminates.

Otherwise, a determination is made as to whether a new section of the aircraft has been selected for the position of the aircraft (operation 1926). If any section has been selected, the process then returns to operation 1910 as described above.

If a new section has not been selected, a determination is made as to whether a new position has been selected for the aircraft (operation 1928). If a new position has been selected, the process then returns to operation 1908 as described above. If a new position has not been selected, the process determines whether a new building has been selected (operation 1930). If a new building has been selected, the process returns to operation 1904. Otherwise, the process returns to operation 1924.

Figure 20:
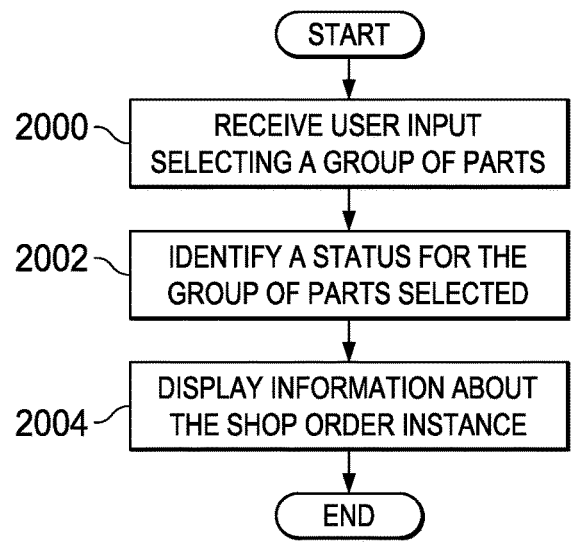
FIG. 20 is an illustration of a flowchart of a process for identifying information about the status of a shop order instance in accordance with an illustrative embodiment.

Turning now to FIG. 20, an illustration of a flowchart of a process for identifying information about the status of a shop order instance is depicted in accordance with an illustrative embodiment. The process illustrated in FIG. 20 may be implemented using status identifier 206 in FIG. 2.

The process begins by receiving user input selecting a group of parts (operation 2000). In operation 2000, the user input making the selection of the group of parts may be selected from one of a selection of the group of parts from a list of the parts and a selection of the group of parts from a display of the graphical representation of the parts in the graphical user interface.

The process then identifies a status for the group of parts selected (operation 2002). The status may be made by querying a shop order database containing shop order instances. The database may be one specific for a particular section when these operations are implemented with operations in FIG. 19. In another case, the database may be shop order instances for an entire aircraft depending on the particular implementation.

The process then displays information about the shop order instance (operation 2004), with the process terminating thereafter. This information may be displayed in the graphical user interface in association with the graphical representation of the group of parts selected through the user input. For example, information may be displayed in a window near or on top of the graphical representation of the group of parts selected. The information displayed may be information such as illustrated for shop order instance 500 in FIG. 5.

This process may be repeated any number of times for different parts selected from the graphical representations of those parts in a graphical user interface. In this manner, an operator may more easily identify shop order instances in a status of the shop order instances for particular portions of an aircraft that may be of interest to the operator.

Figure 21:
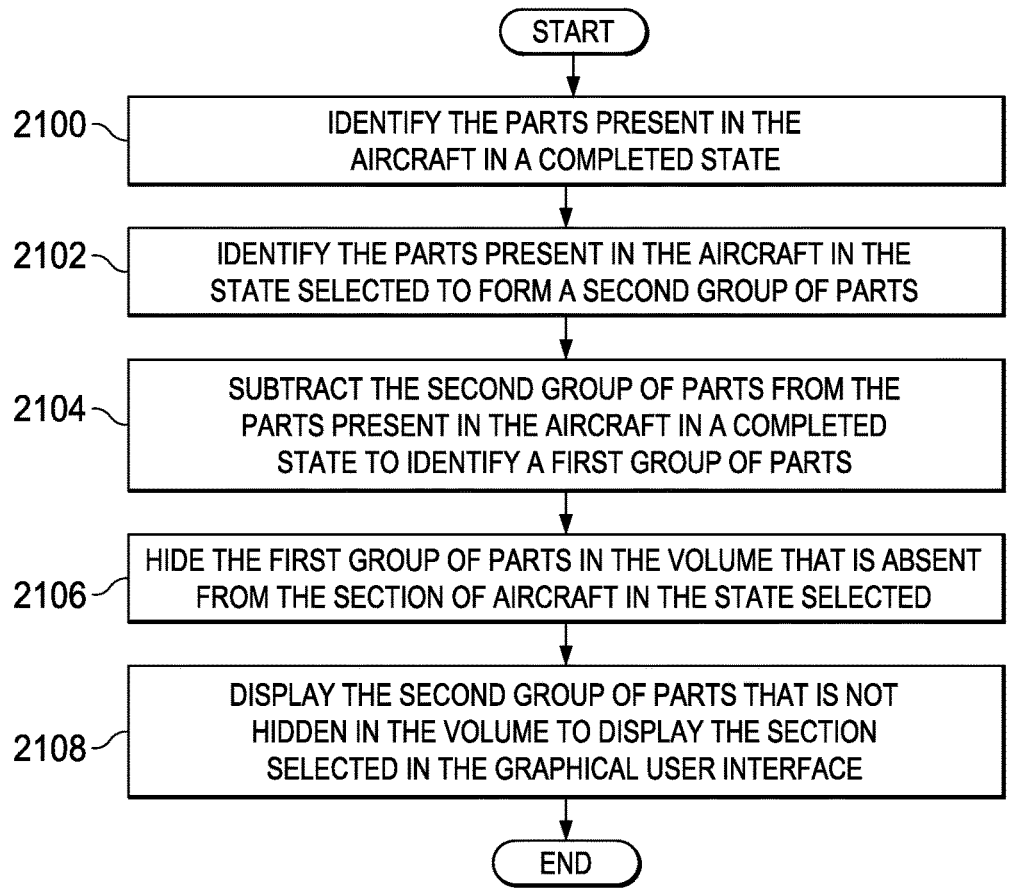
FIG. 21 is an illustration of a flowchart of a process for displaying a section in a graphical user interface in accordance with an illustrative embodiment.

Turning now to FIG. 21, an illustration of a flowchart of a process for displaying a section in a graphical user interface is depicted in accordance with an illustrative embodiment. The different operations illustrated in FIG. 21 are examples of an implementation for operation 1920 in FIG. 19.

The process identifies the parts present in the aircraft in a completed state (operation 2100). Thereafter, the process identifies the parts present in the aircraft in the state selected to form a second group of parts (operation 2102). The second group of parts is subtracted from the parts present in the aircraft in a completed state to identify a first group of parts (operation 2104).

The process hides the first group of parts in the volume that is absent from the section of aircraft in the state selected (operation 2106). The second group of parts that is not hidden in the volume is displayed to display the section selected in the graphical user interface (operation 2108), with the process terminating thereafter.

Figure 22:
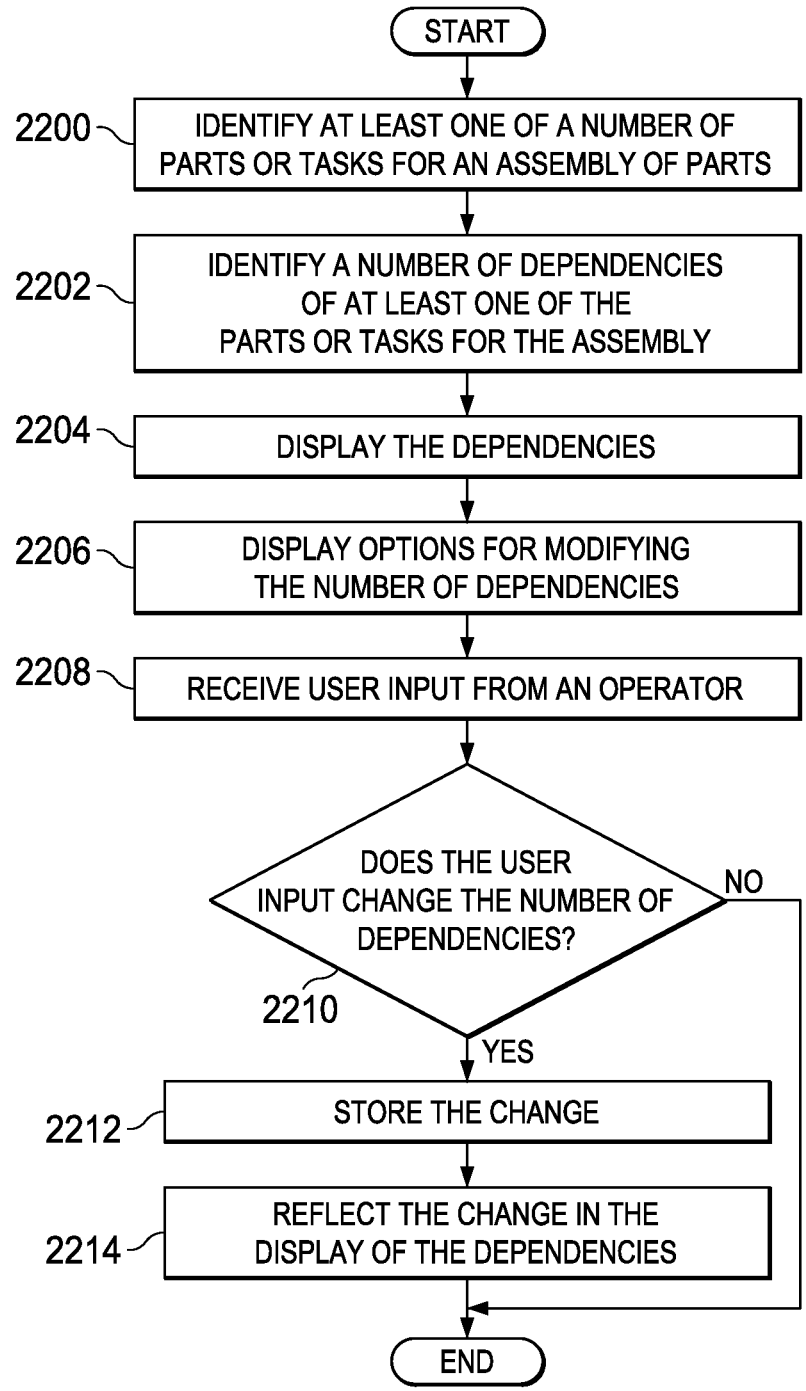
FIG. 22 is an illustration of a flowchart of a process for managing dependencies for at least one of a number of parts or a number of tasks in an aircraft in accordance with an illustrative embodiment.

With reference now to FIG. 22, an illustration of a flowchart of a process for managing dependencies for at least one of a number of parts or a number of tasks in an aircraft is depicted in accordance with an illustrative embodiment. The process illustrated in FIG. 22 may be implemented in manufacturing environment 100 in FIG. 1. In particular, one or more of the different operations illustrated may be implemented using object manager 124 in FIG. 1. This process may be implemented to manage dependency structures 213 in FIG. 2 for performing tasks 118 as assigned using shop order instances 132 in FIG. 1.

The process begins by identifying at least one of a number of parts or tasks for an assembly of parts (operation 2200). The process then identifies a number of dependencies of at least one of the parts or the tasks for the assembly (operation 2202). The dependencies are displayed (operation 2204). The display of the dependencies may take various forms. For example, a dependency chart that is similar to the dependency illustrated in graph 800 in FIG. 8 may be used.

The process displays options for modifying the number of dependencies (operation 2206). The process then receives user input from an operator (operation 2208). Next, a determination is made as to whether the user input changes the number of dependencies (operation 2210).

If a change is made to the number of dependencies, the process then stores the change (operation 2212). The change to the number of dependencies may include new dependencies, removed dependencies, and modified dependencies.

The change is reflected in the display of dependencies (operation 2214), with the process terminating thereafter. With reference again to operation 2210, if the user input does not change the dependencies, the process also terminates.

Figure 23:
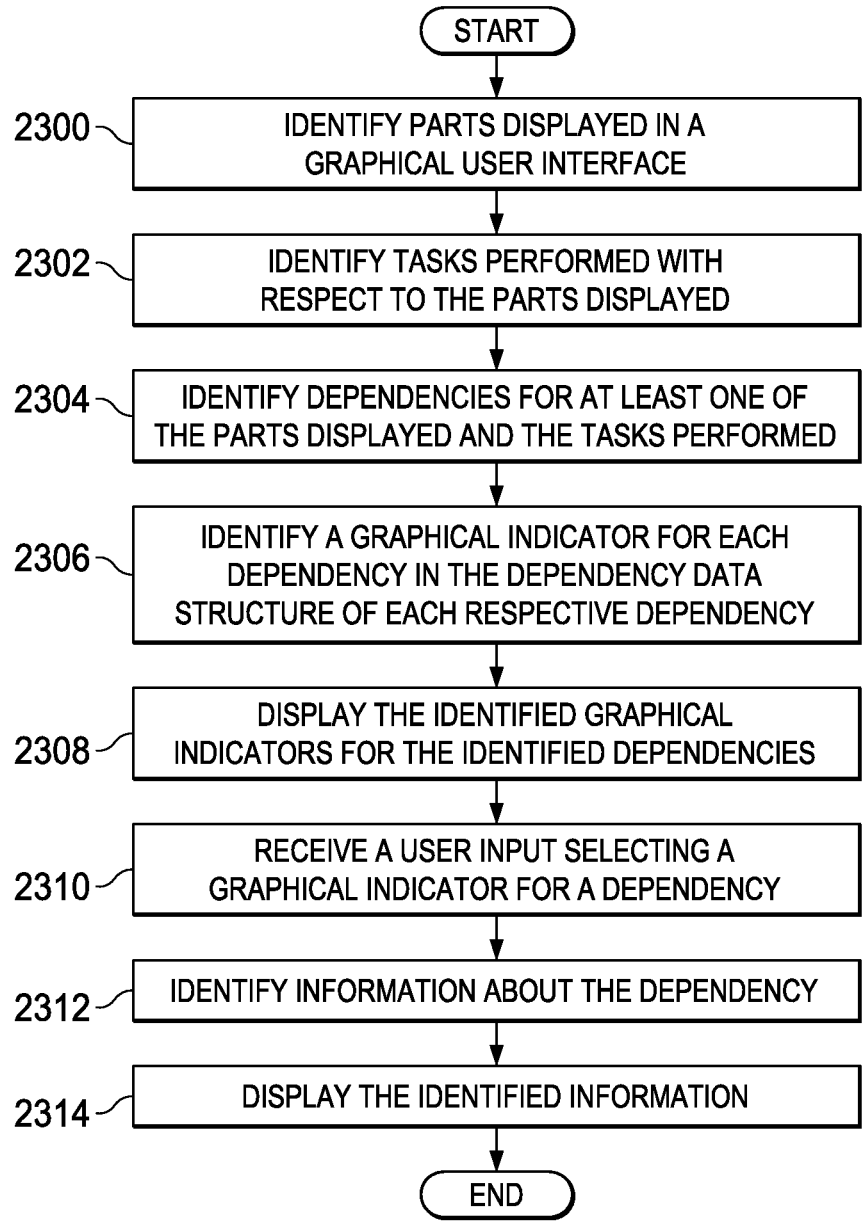
FIG. 23 is an illustration of a flowchart of a process for displaying graphical indicators of dependencies in accordance with an illustrative embodiment.

With reference now to FIG. 23, an illustration of a flowchart of a process for displaying graphical indicators of dependencies is depicted in accordance with an illustrative embodiment. The process illustrated in FIG. 23 may be implemented in manufacturing environment 100 in FIG. 1. In particular, one or more of the different operations illustrated may be implemented using object manager 124 in FIG. 1.

In this illustrative example, the different operations in FIG. 23 may be implemented to show dependencies between parts in an assembly for a shop order instance. Further, the different operations also may be used to show dependencies between different assemblies. The dependencies may be displayed during the display of an assembly in the context of other assemblies such as described in FIG. 16 and in FIG. 17.

The process begins by identifying parts displayed in a graphical user interface (operation 2300). The process also identifies tasks performed with respect to the parts displayed (operation 2302). The process further identifies dependencies for at least one of the parts displayed and the tasks performed (operation 2304). In these illustrative examples, each dependency is defined by a dependency data structure.

The process still further identifies a graphical indicator for each dependency in the dependency data structure of each respective dependency (operation 2306). The process then displays the identified graphical indicators for the identified dependencies (operation 2308). In this illustrated process, the dependency data structure of each respective dependency is an example of dependency structure 700 in FIG. 7. The graphical indicator for each dependency is an example of graphical indicator 704 in FIG. 7.

Next, the process receives a user input selecting a graphical indicator for a dependency (operation 2310). The process identifies information about the dependency (operation 2312). The process then displays the identified information (operation 2314), with the process terminating thereafter. In this illustrated process, the identified information for the dependency includes description 706 in FIG. 7. The identified information may also include rule 702 in FIG. 7 and a status for whether the dependency has been met.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operations for other functions relating to shop order instances also may be used in addition to or in place of the ones depicted. In one illustrative example, operations may be included to verify or update the status of shop order instances displayed in graphical user interfaces in accordance with an illustrative embodiment. As another illustrative example, operation 1900 and operation 1902 may be omitted when only a single building is present.

As another illustrative example, the display of graphical indicators for the status of assemblies and shop order instances may be omitted in some illustrative examples. As another example, an operator may toggle back and forth between showing other assemblies with the assembly for the shop order instance. In yet other illustrative examples, other types of views may be displayed such as an exploded view based on particular commands received while viewing an assembly for a shop order instance. In still other illustrative examples, the selection of a part or assembly also may display information about the shop order instance associated with the part or assembly.

Turning now to FIG. 24, an illustration of a block diagram of a data processing system is depicted in accordance with an illustrative embodiment. Data processing system 2400 may be used to implement computer system 126 in FIG. 1. In this illustrative example, data processing system 2400 includes communications framework 2402, which provides communications between processor unit 2404, memory 2406, persistent storage 2408, communications unit 2410, input/output unit 2412, and display 2414. In this example, communications framework may take the form of a bus system.

Processor unit 2404 serves to execute instructions for software that may be loaded into memory 2406. Processor unit 2404 may be a number of processors, a multi-processor core, or some other type of processor, depending on the particular implementation.

Memory 2406 and persistent storage 2408 are examples of storage devices 2416. A storage device is any piece of hardware that is capable of storing information, such as, for example, without limitation, data, program code in functional form, and/or other suitable information either on a temporary basis and/or a permanent basis. Storage devices 2416 may also be referred to as computer readable storage devices in these illustrative examples. Memory 2406, in these examples, may be, for example, a random access memory or any other suitable volatile or non-volatile storage device. Persistent storage 2408 may take various forms, depending on the particular implementation.

For example, persistent storage 2408 may contain one or more components or devices. For example, persistent storage 2408 may be a hard drive, a flash memory, a rewritable optical disk, a rewritable magnetic tape, or some combination of the above. The media used by persistent storage 2408 also may be removable. For example, a removable hard drive may be used for persistent storage 2408.

Communications unit 2410, in these illustrative examples, provides for communications with other data processing systems or devices. In these illustrative examples, communications unit 2410 is a network interface card.

Input/output unit 2412 allows for input and output of data with other devices that may be connected to data processing system 2400. For example, input/output unit 2412 may provide a connection for user input through a keyboard, a mouse, and/or some other suitable input device. Further, input/output unit 2412 may send output to a printer. Display 2414 provides a mechanism to display information to a user.

Instructions for the operating system, applications, and/or programs may be located in storage devices 2416, which are in communication with processor unit 2404 through communications framework 2402. The processes of the different embodiments may be performed by processor unit 2404 using computer-implemented instructions, which may be located in a memory, such as memory 2406.

These instructions are referred to as program code, computer usable program code, or computer readable program code that may be read and executed by a processor in processor unit 2404. The program code in the different embodiments may be embodied on different physical or computer readable storage media, such as memory 2406 or persistent storage 2408.

Program code 2418 is located in a functional form on computer readable media 2420 that is selectively removable and may be loaded onto or transferred to data processing system 2400 for execution by processor unit 2404. Program code 2418 and computer readable media 2420 form computer program product 2422 in these illustrative examples. In one example, computer readable media 2420 may be computer readable storage media 2424 or computer readable signal media 2426. In these illustrative examples, computer readable storage media 2424 is a physical or tangible storage device used to store program code 2418 rather than a medium that propagates or transmits program code 2418.

Alternatively, program code 2418 may be transferred to data processing system 2400 using computer readable signal media 2426. Computer readable signal media 2426 may be, for example, a propagated data signal containing program code 2418. For example, computer readable signal media 2426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2400 are not meant to provide architectural limitations to the manner in which different embodiments may be implemented. The different illustrative embodiments may be implemented in a data processing system including components in addition to and/or in place of those illustrated for data processing system 2400. Other components shown in FIG. 24 can be varied from the illustrative examples shown. The different embodiments may be implemented using any hardware device or system capable of running program code 2418.

Illustrative embodiments of the disclosure may be described in the context of aircraft manufacturing and service method 2500 as shown in FIG. 25 and aircraft 2600 as shown in FIG. 26. Turning first to FIG. 25, an illustration of a block diagram of an aircraft manufacturing and service method is depicted in accordance with an illustrative embodiment. During pre-production, aircraft manufacturing and service method 2500 may include specification and design 2502 of aircraft 2600 in FIG. 26 and material procurement 2504.

During production, component and subassembly manufacturing 2506 and system integration 2508 of aircraft 2600 in FIG. 26 takes place. Thereafter, aircraft 2600 in FIG. 26 may go through certification and delivery 2510 in order to be placed in service 2512. While in service 2512 by a customer, aircraft 2600 in FIG. 26 is scheduled for routine maintenance and service 2514, which may include modification, reconfiguration, refurbishment, and other maintenance or service.

Each of the processes of aircraft manufacturing and service method 2500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of a block diagram of an aircraft is depicted in which an illustrative embodiment may be implemented. In this example, aircraft 2600 is produced by aircraft manufacturing and service method 2500 in FIG. 25 and may include airframe 2602 with systems 2604 and interior 2606. Examples of systems 2604 include one or more of propulsion system 2608, electrical system 2610, hydraulic system 2612, and environmental system 2614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2500 in FIG. 25.

For example, one or more illustrative embodiments may be implemented during system integration 2508. The different illustrative examples may be implemented to identify a status of shop order instances used to perform tasks to assemble parts on aircraft 2600. Additionally, an illustrative embodiment also may be implemented during maintenance and service 2514. For example, the status of the shop order instances for performance of tasks to assemble parts for maintenance, upgrades, refurbishment, and other operations during maintenance and service 2514 may be identified using an illustrative embodiment.

Figure 27:
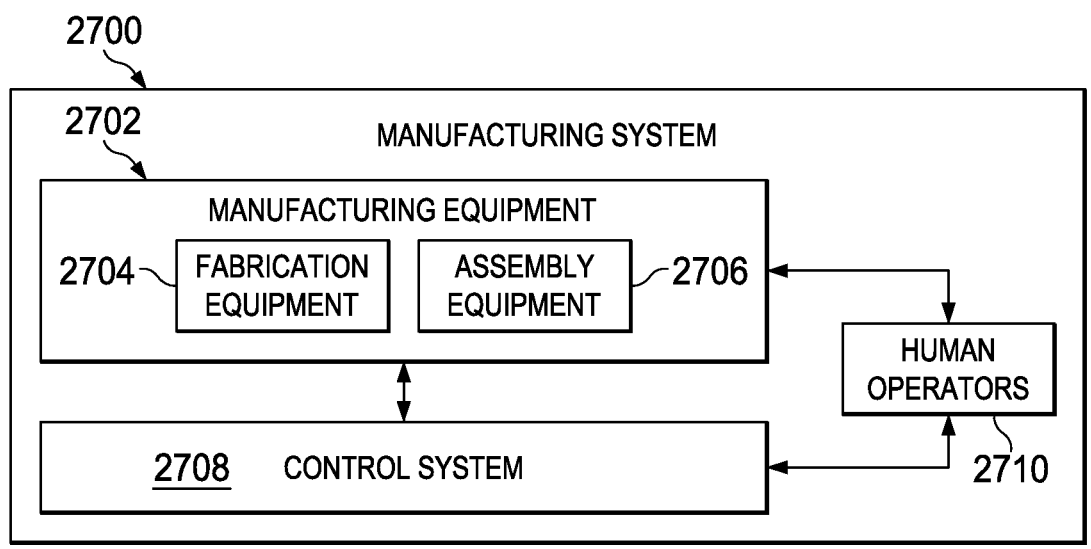
FIG. 27 is an illustration of a block diagram of a manufacturing system in accordance with an illustrative embodiment.

Turning now to FIG. 27, an illustration of a block diagram of a manufacturing system is depicted in accordance with an illustrative embodiment. Manufacturing system 2700 is a physical hardware system and is configured to manufacture products, such as aircraft 2600 in FIG. 26.

As depicted, manufacturing system 2700 includes manufacturing equipment 2702. Manufacturing equipment 2702 includes at least one of fabrication equipment 2704 or assembly equipment 2706.

Fabrication equipment 2704 is equipment that may be used to fabricate components for parts used to form aircraft 2600. For example, fabrication equipment 2704 may include machines and tools. These machines and tools may be at least one of a drill, a hydraulic press, a furnace, a mold, a composite tape laying machine, a vacuum system, a lathe, or other suitable types of equipment. Fabrication equipment 2704 may be used to fabricate at least one of metal parts, composite parts, semiconductors, circuits, fasteners, ribs, skin panels, spars, antennas, pharynx, or other suitable types of parts.

Assembly equipment 2706 is equipment used to assemble parts to form aircraft 2600. In particular, assembly equipment 2706 may be used to assemble components and parts to form aircraft 2600. Assembly equipment 2706 also may include machines and tools. These machines and tools may be at least one of a robotic arm, a crawler, a faster installation system, a rail-based drilling system, or a robot. Assembly equipment 2706 may be used to assemble parts such as seats, horizontal stabilizers, wings, engines, engine housings, landing gear systems, and other parts for aircraft 2600.

Manufacturing system 2700 also includes control system 2708. Control system 2708 is a hardware system and may also include software or other types of components. Control system 2708 is configured to control the operation of manufacturing equipment 2702. Control system 2708 may be implemented using hardware. The hardware may include computers, circuits, networks, and other types of equipment. The control may take the form of direct control of manufacturing equipment 2702. For example, robots, computer-controlled machines, and other equipment may be controlled by control system 2708. In other illustrative examples, control system 2708 may manage operations performed by human operators 2710 in manufacturing aircraft 2600. In these illustrative examples, object manager 124 in FIG. 1 may be implemented in control system 2708 to manage the manufacturing of aircraft 2600 in FIG. 26.

In the different illustrative examples, human operators 2710 may operate or interact with at least one of manufacturing equipment 2702 or control system 2708. This interaction may be performed to manufacture aircraft 2600.

Of course, manufacturing system 2700 may be configured to manufacture other products. Although manufacturing system 2700 has been described with respect to manufacturing in the aerospace industry, manufacturing system 2700 may be configured to manufacture products for other industries. For example, manufacturing system 2700 may be configured to manufacture products for the automotive industry as well as any other suitable industries.

In this manner, operators may visualize information about the status of shop order instances using a graphical user interface. This visualization includes displaying graphical indicators of the status of shop order instances in association with graphical representations of the parts on which tasks are performed.

Further, control system 2708 with object manager 124 may monitor the manufacturing of aircraft 2600. This monitoring may be through the status of shop order instances as described above. The status of shop order instances may also be used to visually display the status of the manufacturing of aircraft 2600. This display may be based on the positions in an assembly line for aircraft 2600.

Additionally, an analysis of the shop order instances may also be used to identify and flag problem areas. These problem areas may be, for example, areas in which completion of shop order instances may be slower than desired, areas in which non-conformances are greater than desired, or other undesirable situations. Control system 2708 may control manufacturing equipment 2702 to halt manufacturing in a problem area until the problem is resolved. In other illustrative examples, control system 2708 may send instructions to human operators 2710 to halt manufacturing and resolve an issue in a problem area.

Thus, with one or more illustrative embodiments, understanding instructions in shop order instances for parts to be assembled form assemblies may be made easier for operators. In one or more illustrative embodiments, the visualization of an assembly of parts for a shop order instance is displayed to an operator. Further, other assemblies that are adjacent to or within some selected distance of the assembly for the shop order instance also are displayed. This display provides a visual context for an operator that has to perform operations for an assembly according to instructions in the shop order instance.

With the visualization of the assembly and other assemblies within a selected distance of the assembly for visual context, the amount of time needed for an operator to comprehend instructions and perform operations to assemble parts to form the assembly may be reduced. As a result, time, training, and expense needed to assemble an object such as an aircraft may be reduced.

The description of the different illustrative embodiments has been presented for purposes of illustration and description, and is not intended to be exhaustive or limited to the embodiments in the form disclosed. Many modifications and variations will be apparent to those of ordinary skill in the art.

For example, the illustrative examples may be applied to different states during manufacturing of an object. For example, planned states as well as actual states may be selected for display with respect to obtaining information about tasks such as those in shop order instances. For planned or actual states, the parts actually present in those states may be used when displaying information about shop order instances. This information may include the visualization of the assembly in context with other assemblies as well as other information. In this manner, visualization of assemblies for particular states and shop order instance information may be better visualized. Further, this type of visualization may also make planning or modifying shop order instances less tedious and difficult.

Other illustrative examples may be applied to other parts of a life cycle of an aircraft other than manufacturing. For example, the illustrative examples may be applied to maintenance of an aircraft. An illustrative example may include providing visualization during refurbishment, upgrades, and other operations that may be performed during maintenance of an aircraft.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for visualizing an assembly of parts for an aircraft, the method comprising:
    identifying, by a processor, a particular position of the aircraft on an assembly line comprising a plurality of aircraft which includes the aircraft, wherein each of the plurality of aircraft has a different position on the assembly line;
    identifying, by the processor, a shop order instance for the assembly of parts for the aircraft, wherein the shop order instance is selected from a shop order database containing shop order instances that can be generated for only the particular position;
    identifying dynamically, by the processor, a volume for the shop order instance when a user selects the shop order instance that includes the assembly of parts, wherein the volume is based on at least one of a section in which the assembly of parts is located or a selected distance from the assembly of parts, and wherein the volume includes a number of assemblies of other parts that may be adjacent to or within the selected distance of the assembly of parts; and
    displaying, by a tangible display device according to a command from the processor, graphical representations of the assembly of parts within the volume in context with the number of assemblies of other parts as shown visually within the volume on a graphical user interface of the display device.

2. The method of claim 1 further comprising:
    displaying a set of graphical indicators in association with at least one of the assembly of parts and the number of assemblies, wherein the set of graphical indicators indicates a status of shop order instances for at least one of the assembly and the number of assemblies.

3. The method of claim 1 further comprising:
    identifying parts present in the volume.

4. The method of claim 3, wherein the parts present in the volume are for a current state of assembly of the aircraft on an assembly line.

5. The method of claim 1, wherein identifying the shop order instance for the assembly of parts for the aircraft comprises:
    receiving a user input identifying the shop order instance for the assembly of parts for the aircraft.

6. The method of claim 1 further comprising:
    displaying a set of graphical indicators indicating dependencies between parts in at least one of the assembly of parts or the number of assemblies of the other parts within the volume.

7. The method of claim 1 further comprising:
    building the aircraft based on displaying the assembly of parts.

8. The method of claim 1 further comprising:
    identifying a state from states of assembly for the aircraft.

9. The method of claim 8 further comprising:
    identifying parts that are present for the state in the volume corresponding to the section.

10. An aircraft management system comprising:
    an object manager comprising a memory configured to store one or more sets of instructions; and
    a processor coupled to the memory, the processor configured to execute the one or more sets of instructions, to:
        identify, by the processor, a particular position of an aircraft on an assembly line comprising a plurality of aircraft which includes the aircraft, wherein each of the plurality of aircraft has a different position on the assembly line;
        identify a shop order instance for an assembly of parts for an aircraft, wherein the shop order instance is selected from a shop order database containing shop order instances that can be generated for only the particular position;
        identify dynamically a volume for the shop order instance when a user selects the shop order instance that includes the assembly of parts, wherein the volume is based on at least one of a section in which the assembly of parts is located or a selected distance from the assembly of parts, and wherein the volume includes a number of assemblies of other parts that may be adjacent to or within the selected distance of the assembly of parts; and
        display graphical representations of the assembly of parts within the volume in context with the number of assemblies of other parts as shown visually within the volume on a graphical user interface of the aircraft management system; and
    a manufacturing system comprising manufacturing equipment configured to assemble the aircraft based on the shop order instance.

11. The aircraft management system of claim 10, wherein the processor is further configured to execute the object manager to display the assembly of parts without the context with the other parts within the volume.

12. The aircraft management system of claim 11, wherein in being configured to display the assembly of parts without the context with the other parts within the volume, the processor is further configured to execute the object manager to display an exploded view of the assembly of parts without the context with the other parts within the volume.

13. The aircraft management system of claim 10, wherein the processor is further configured to execute the object manager to display a set of graphical indicators in association with at least one of the assembly of parts and the number of assemblies, wherein the set of graphical indicators indicates a status of shop order instances for at least one of the assembly of parts and the number of assemblies.

14. The aircraft management system of claim 10, wherein the processor is further configured to execute the object manager to identify parts present in the volume.

15. The aircraft management system of claim 14, wherein the parts present in the volume are for a current state of assembly of the aircraft on an assembly line.

16. The aircraft management system of claim 10, wherein in being configured to identify the shop order instance for the assembly of parts for the aircraft, the processor is further configured to execute the object manager to receive a user input identifying the shop order instance for the assembly of parts for the aircraft.

17. The aircraft management system of claim 10, wherein the processor is further configured to execute the object manager to display a set of graphical indicators indicating dependencies between parts in at least one of the assembly of parts or the number of assemblies of the other parts within the volume.

18. The aircraft management system of claim 10 wherein the processor is further configured to execute the one or more sets of instructions to:
   identify a state from states of assembly for the aircraft.

19. The aircraft management system of claim 18 wherein the processor is further configured to execute the one or more sets of instructions to:
   identify parts that are present for the state in the volume corresponding to the section.

* * * * *